(12) United States Patent
Nishio et al.

(10) Patent No.: US 6,192,039 B1
(45) Date of Patent: *Feb. 20, 2001

(54) METHOD FOR FLOW CONTROL, NODE AND COMMUNICATION NETWORK EMPLOYING THE FLOW CONTROL

(75) Inventors: Masaya Nishio; Noriteru Shinagawa, both of Yokohama; Yoneo Watanabe, Fujiyoshida; Motoharu Tanaka, Yokohama, all of (JP)

(73) Assignee: YRP Mobile Telecommunications Key Technology Research Laboratories Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/820,607

(22) Filed: Mar. 19, 1997

(30) Foreign Application Priority Data

Mar. 25, 1996 (JP) .................................................. 8-093018
Feb. 7, 1997 (JP) .................................................. 9-039855

(51) Int. Cl.[7] .................................................. H04L 12/56
(52) U.S. Cl. .................................................. 370/331; 370/415
(58) Field of Search .................................................. 470/331, 230, 470/235, 338, 401, 428, 429; 455/436, 437, 438, 439, 440, 441, 442, 443, 412, 415

(56) References Cited

U.S. PATENT DOCUMENTS

| | | | |
|---|---|---|---|
| 5,029,164 | * 7/1991 | Goldstein et al. | 370/235 |
| 5,126,999 | * 6/1992 | Munter et al. | 370/415 |
| 5,146,609 | * 9/1992 | Tayloe et al. | 455/436 |
| 5,181,200 | * 1/1993 | Harrison | 455/33.2 |
| 5,323,446 | * 6/1994 | Kojima et al. | 370/332 |
| 5,463,620 | * 10/1995 | Sriram | 370/412 |
| 5,473,604 | 12/1995 | Lorenz et al. | 370/60 |
| 5,487,065 | * 1/1996 | Acampora et al. | 455/437 |
| 5,517,495 | * 5/1996 | Lund et al. | 370/414 |
| 5,528,583 | 6/1996 | Acampora et al. | 370/54 |
| 5,530,693 | * 6/1996 | Averbuch et al. | 379/60 |
| 5,561,844 | * 10/1996 | Jayapalan et al. | 455/442 |
| 5,748,629 | * 5/1998 | Caldara et al. | 370/389 |
| 5,864,578 | * 1/1999 | Yunen | 375/200 |
| 5,875,185 | * 2/1999 | Wang et al. | 370/331 |
| 6,023,461 | * 2/2000 | Raychaudhuri et al. | 370/331 |

FOREIGN PATENT DOCUMENTS

| | | | |
|---|---|---|---|
| 5-227196 | 9/1993 | (JP) | H04L/12/48 |
| 8-046643 | 2/1996 | (JP) | H04L/12/56 |

OTHER PUBLICATIONS

"Signaling Network Architecture and Transaction Protocols to Support Realtime Connection Rerouting in ATM/B–ISDNs", Yu et al., Proceeding of IEEE Infocom 1996, vol. 3, pp. 1012–1019, San Francisco, Mar. 24–28, 1996, IEEE 0–8186–7293–5.

* cited by examiner

Primary Examiner—Douglas Olms
Assistant Examiner—Kenneth Vanderpuye
(74) Attorney, Agent, or Firm—Ladas & Parry

(57) ABSTRACT

There is provided a method for a flow control to a mobile communication network in which an ATM virtual channel established between a first base station having a radio zone in which a mobile station exists and a terminating ATM node to which a remote station with which the mobile station communicates is connected. The first step of the method is to queue, in an ATM node, incoming cells to be sent to a second base station having a radio zone when the mobile station is handed over to the radio zone of the second base station. The second step of the method is to stop queuing and send the incoming cells queued in the ATM node to the second base station after the mobile station is handed over.

14 Claims, 33 Drawing Sheets

FIG.10

| FIG.10A |
|---|
| FIG.10B |

FIG. 21A

| STORE START CELL |
|---|
| IDs |
| VCIs |
| IDd |
| IDm |
| PATH TO UPPER STATION |
| VIRTUAL CHANNEL TO UPPER STATION |
| VIRTUAL CHANNEL TO UPPER STATION FOR BUFFERING TERMINAL |
| VIRTUAL CHANNEL TO HAND-OVER DESTINATION FOR BUFFERING TERMINAL |

FIG. 21C

| STORE START ACKNOWLEDGE CELL |
|---|
| IDs |
| VCIs |
| IDd |
| IDm |
| PATH TO UPPER STATION |
| VIRTUAL CHANNEL TO UPPER STATION |
| VIRTUAL CHANNEL TO UPPER STATION FOR BUFFERING TERMINAL |
| VIRTUAL CHANNEL TO HAND-OVER DESTINATION FOR BUFFERING TERMINAL |

FIG. 21B

| STORE END CELL |
|---|
| PATH TO UPPER STATION |
| VIRTUAL CHANNEL TO UPPER STATION |
| VIRTUAL CHANNEL TO UPPER STATION FOR BUFFERING TERMINAL |
| VIRTUAL CHANNEL TO HAND-OVER DESTINATION FOR BUFFERING TERMINAL |
| TRANSMISSION PATH TO HAND-OVER DESTINATION |
| VIRTUAL CHANNEL TO HAND-OVER DESTINATION |
| BIT RATE FOR TRANSMISSION |

FIG. 21D

| NUMBER-OF-STORED-CELLS NOTIFICATION CELL |
|---|
| PATH TO UPPER STATION |
| VIRTUAL CHANNEL TO UPPER STATION |
| VIRTUAL CHANNEL TO UPPER STATION FOR BUFFERING TERMINAL |
| VIRTUAL CHANNEL TO HAND-OVER DESTINATION FOR BUFFERING TERMINAL |
| TRANSMISSION PATH TO HAND-OVER DESTINATION |
| VIRTUAL CHANNEL TO HAND-OVER DESTINATION |
| NUMBER OF STORED CELLS |

FIG. 22

| FIG. 22A |
| FIG. 22B |
| FIG. 22C |

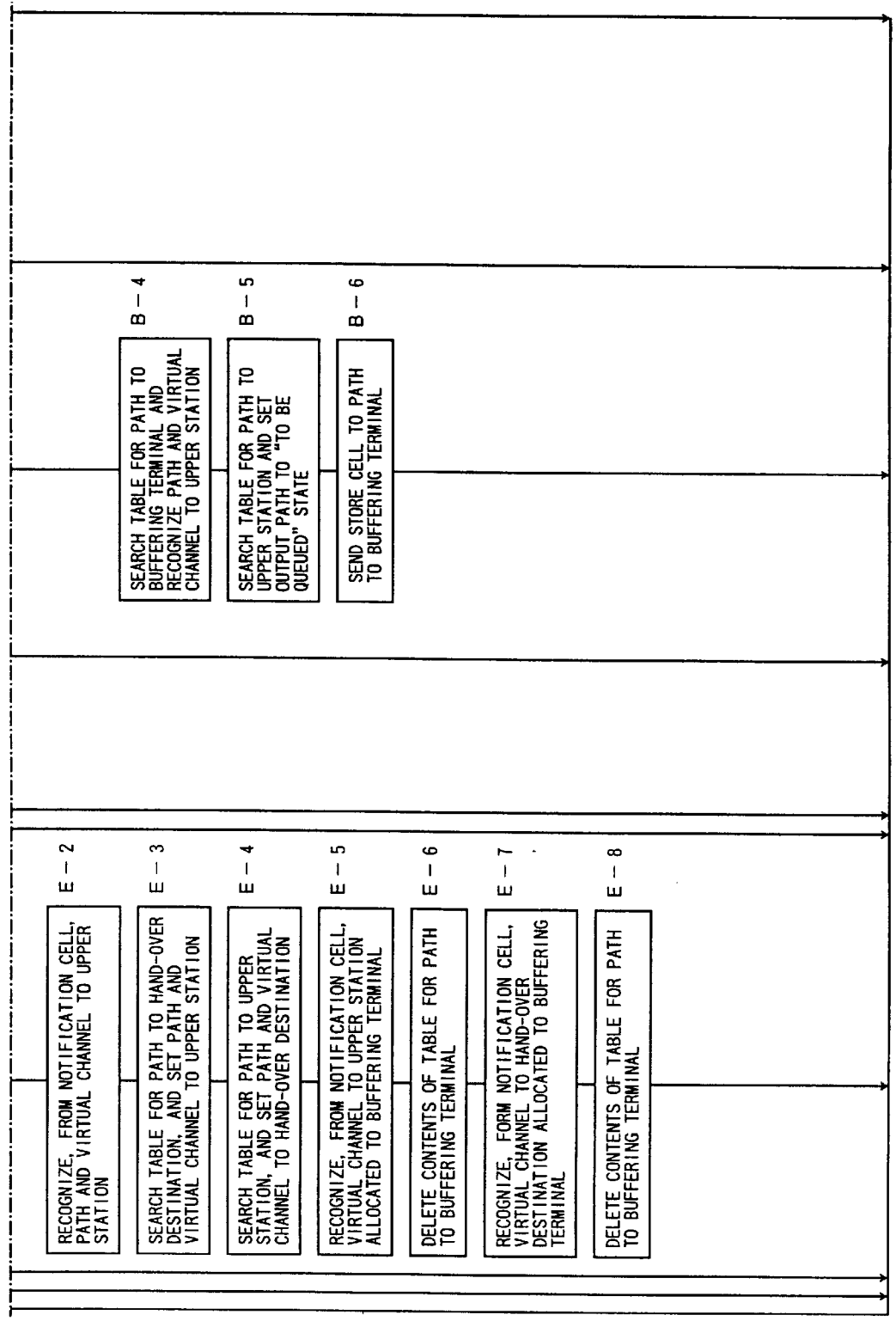

ND COMMUNICATION NETWORK
METHOD FOR FLOW CONTROL, NODE AND COMMUNICATION NETWORK EMPLOYING THE FLOW CONTROL

BACKGROUND OF THE INVENTION

1. Field of the Invention

The present invention generally relates to methods for flow control, and more particularly to a flow control method directed to a hand-over process inherent in a telecommunication system in which an ATM system is applied to a multimedia mobile telecommunication network of a microcell system.

2. Description of the Related Art

Recently, there has been considerable activity in the research and development of a high-rate multimedia transmission in mobile telecommunications. Such a system is required to reduce the transmission power. It is thus required to reduce the telecommunication zone (cell) covered by a single base station and to employ a radio zone as narrow as approximately 100 m. It should be noted that the zone covered by one base station in a conventional automobile or portable telephone system is as large as approximately a few kilometers. When the radio zone is narrow as described above, a mobile station traveling at a high speed will go out of the current radio zone soon and enter another radio zone. Hence, it is required to use a hand-over process directed to prevent a communication from being interrupted. The hand-over process switches the base stations when the mobile station travels over radio zones so that the mobile station can continue to communicate with the other station.

In the conventional mobile telecommunication system, a communication is instantaneously broken for a time of 0.7–0.8 seconds when the channel used in the communication is switched. This is caused by an event in which data transferred over a transmission path is merely lost during the hand-over process. The instantaneous break of communication causes a loss of speech or data and results in a degradation in the communication quality. Particularly, the instantaneous break is a serious problem when data is transferred between data processing devices such as computers. Generally, if a loss of data occurs, a retransmission of data is required. However, such a data retransmission increases traffic. If a relatively narrow radio zone is employed, the hand-over should be frequently carried out. In this case, it is very important to consider problems due to the instantaneous break. In order to eliminate the problems caused by the instantaneous break, it is necessary to improve not only the radio channel switching technique but also the flow control of the whole telecommunication system and to thus prevent data from being lost during the hand-over process.

SUMMARY OF THE INVENTION

It is a general object of the present invention to provide a flow control method, a node, a telecommunication system employing the same, in which the above disadvantages are eliminated.

A more specific object of the present invention is to prevent data from being lost during a hand-over process and provide reliable mobile communication services.

The above objects of the present invention are achieved by a method for a flow control to a mobile communication network in which an ATM virtual channel established between a first base station having a radio zone in which a mobile station exists and a terminating ATM node to which a remote station with which the mobile station communicates is connected, the method comprising the steps of: (a) queuing, in an ATM node, incoming cells to be sent to a second base station having a radio zone when the mobile station is handed over to the radio zone of the second base station; and (b) stopping queuing and sending the incoming cells queued in the ATM node to the second base station after the mobile station is handed over.

The above method may be configured so that the ATM node in which the incoming cells are queued at the step (a) accommodates the first and second base stations.

The method may be configured so that the ATM node in which the incoming cells are queued at the step (a) is an ATM node connected to a first ATM node accommodating the first base station and a second ATM node accommodating the second base station.

The above objects of the present invention are also achieved by a method for a flow control to a mobile communication network in which an ATM virtual channel established between a first base station having a radio zone in which a mobile station exists and a terminating ATM node to which a remote station with which the mobile station communicates is connected, the method comprising the steps of: (a) sending hand-over start information to an ATM node accommodating the first base station therefrom when the mobile station moves to a radio zone covered by a second base station; (b) recognizing, in an ATM node in which the ATM virtual channel between the mobile station and the remote station is formed even after a hand-over, an ATM transmission path and an ATM virtual channel directed to the second base station; (c) queuing, in the ATM node, incoming cells to be transferred via the recognized ATM transmission path; (d) sending hand-over end information to the ATM node from the second base station when the hand-over is completed; (f) recognizing, from the hand-over end information, the ATM transmission path and the ATM virtual channel directed to the second ratio base station; (g) stopping queuing at the step (c) and outputting the incoming cells queued to the second base station via the recognized ATM transmission path.

The above method may be configured so that it further comprises the steps of transferring the hand-over start information and the hand-over end information over the ATM transmission path between the first and second base stations and the terminating ATM node so that ATM nodes located in the ATM transmission path receive the hand-over start information and the hand-over end information, whereby the ATM nodes queue cells directed to the second base station in a distributed formation.

The method may be configured so that the step (c) queues the incoming cells in a buffer provided to an input ATM transmission path connected to an upper ATM node.

The above objects of the present invention are also achieved by a method for a flow control to a mobile communication network having a hierarchical structure formed by base stations, ATM nodes directly connected thereto and other ATM nodes, wherein a mobile station located in a radio zone of a first base station communicates with a remote station via an ATM virtual channel formed therebetween, the method comprising the steps of: (a) sending hand-over start information from the first base station to an ATM node accommodating the first base station when the mobile station moves to a second radio zone accommodated in a second base station, the hand-over start information concerning the second base station and an ATM virtual channel established for the mobile station; (b) recognizing, from the hand-over start information, an ATM transmission path and an ATM virtual channel directed to the second base station; (c) queuing, in an upper ATM node located at a hierarchical level higher than the first and second base stations, incoming cells to be transferred via the recognized ATM transmission path; (d) sending hand-over end information to the upper ATM node from the second base station when the hand-over is completed, the hand-over end information including information concerning the second base station and an ATM virtual channel newly established for the mobile station which is handed over thereto; (f) recognizing, in the upper ATM node, the ATM transmission path and the ATM virtual channel directed to the second base station from the hand-over end information; (g) stopping queuing at the step (c) and outputting the incoming cells queued to the second base station via the recognized ATM transmission path.

The method may be configured so that it further comprises the step of transferring the hand-over start information and the hand-over end information over the ATM transmission path between the first and second base stations and the terminating ATM node so that ATM nodes located in the ATM transmission path receive the hand-over start information and the hand-over end information, whereby the ATM nodes queue cells directed to the second base station in a distributed formation.

The method may be configured so that the step (c) queues the incoming cells in a buffer provided to an input ATM transmission path connected to an ATM node located at a higher hierarchical level.

The above objects of the present invention are also achieved by an ATM node in a mobile communication network in which an ATM virtual channel established between a first base station having a radio zone in which a mobile station exists and a terminating ATM node to which a remote station with which the mobile station communicates is connected, the ATM node comprising: a first part queuing incoming cells to be sent to a second base station having a radio zone when the mobile station is handed over to the radio zone of the second base station; and a second part stopping queuing of the first part and sending the incoming cells queued to the second base station after the mobile station is handed over.

The above objects of the present invention are also achieved by a mobile communication system in which an ATM virtual channel established between a first base station having a radio zone in which a mobile station exists and a terminating ATM node to which a remote station with which the mobile station communicates is connected, the mobile communication system comprising an ATM node including: a first part queuing incoming cells to be sent to a second base station having a radio zone when the mobile station is handed over to the radio zone of the second base station; and a second part stopping queuing of the first part and sending the incoming cells queued to the second base station after the mobile station is handed over.

The above objects of the present invention are also achieved by a method for a flow control to a communication network in which cells are transferred via a virtual channel established between nodes, the method comprising: (a) temporarily storing incoming cells transferred over an input transmission path in a first buffer in a node in which the virtual channel is switched; (b) switching the virtual channel to another route; (c) allocating a transmission band of an output virtual channel in an output transmission path in order to send the cells stored in the first buffer thereto at a bit rate higher than that of an input virtual channel thereof; (d) sending the cells stored in the first buffer to the output transmission path; and (e) releasing the transmission band allocated to send the cells stored in the first buffer.

The method may be configured so that: the output transmission path is normally allocated so as to have a normal band and a margin band; and the step (c) allocates the transmission band so as to include a part of the normal band and a part of the margin band.

The method may be configured so that the step (a) comprises the step of storing the incoming cells in the first buffer via a cell switch of the node so that the input virtual channel via which the incoming cells are transferred is connected to the first buffer.

The method may be configured so that it further comprises the steps of: (f) temporarily storing further incoming cells in a second buffer provided between the input transmission path and the cell switch; (g) disconnecting the input virtual channel from the first buffer and connecting it to the output virtual channel; and (h) allocating a transmission band in the output transmission path in order to send the cells stored in the second buffer thereto at a bit rate higher than that of the input virtual channel thereof; (d) sending the cells in the second buffer to the output transmission path; and (e) releasing the transmission band allocated to send the cells stored in the second buffer.

The method may be configured so that: the communication network is a mobile communication network; the virtual channel is established between a base station having a radio zone in which a mobile station exits and a node in which a remote terminal with which the mobile station communicates is accommodated; and the steps (a) through (e) are carried out when the virtual channel is switched due to movement of the mobile station to a radio zone of another base station.

The above objects of the present invention are also achieved by a node in a communication network in which cells are transferred via a virtual channel established between nodes, the node comprising: a cell switch; and a buffering terminal, the buffering terminal comprising: a buffer temporarily storing incoming cells transferred over an input transmission path; and a sell sending part allocating a transmission band of an output virtual channel in an output transmission path in order to send the cells stored in the buffer thereto at a bit rate higher than that of an input virtual channel thereof, and sending the cells stored in the buffer to the output transmission path.

The above objects of the present invention are also achieved by a communication network in which cells are transferred via a virtual channel established between nodes, each of the nodes comprising: a cell switch; and a buffering terminal, the buffering terminal comprising: a buffer temporarily storing incoming cells transferred over an input transmission path; and a sell sending part allocating a transmission band of an output virtual channel in an output transmission path in order to send the cells stored in the buffer thereto at a bit rate higher than that of an input virtual channel thereof, and sending the cells stored in the buffer to the output transmission path.

The communication network may be configured so that: the communication network is a mobile communication network; the virtual channel is established between a base station having a radio zone in which a mobile station exits and a node in which a remote terminal with which the mobile station communicates is accommodated; and the buffering terminal operates when the virtual channel is switched due to movement of the mobile station to a radio zone of another base station.

BRIEF DESCRIPTION OF THE DRAWINGS

The other objects, features and advantages of the present invention will become more apparent from the following detailed description when read in conjunction with the accompanying drawings, in which:

FIG. 10 is a diagram showing how

FIGS. 10A and 10B are flowcharts of an operation of a cell switch controller of an ATM node (control station) used in the first and second embodiments of the present invention;

FIGS. 21A, 21B, 21C and 21D are diagrams showing control cells used in the third embodiment of the present invention;

FIG. 22 is a block diagram showing how FIGS. 22A, 22B and 22C are combined;

FIGS. 22A, 22B and 22C are flowcharts of an operation of the third embodiment of the present invention;

DETAILED DESCRIPTION

A description will now be given of a first embodiment of the present invention, which is a mobile telecommunication system including a wire communication part to which an ATM system is applied.

Figure 1:
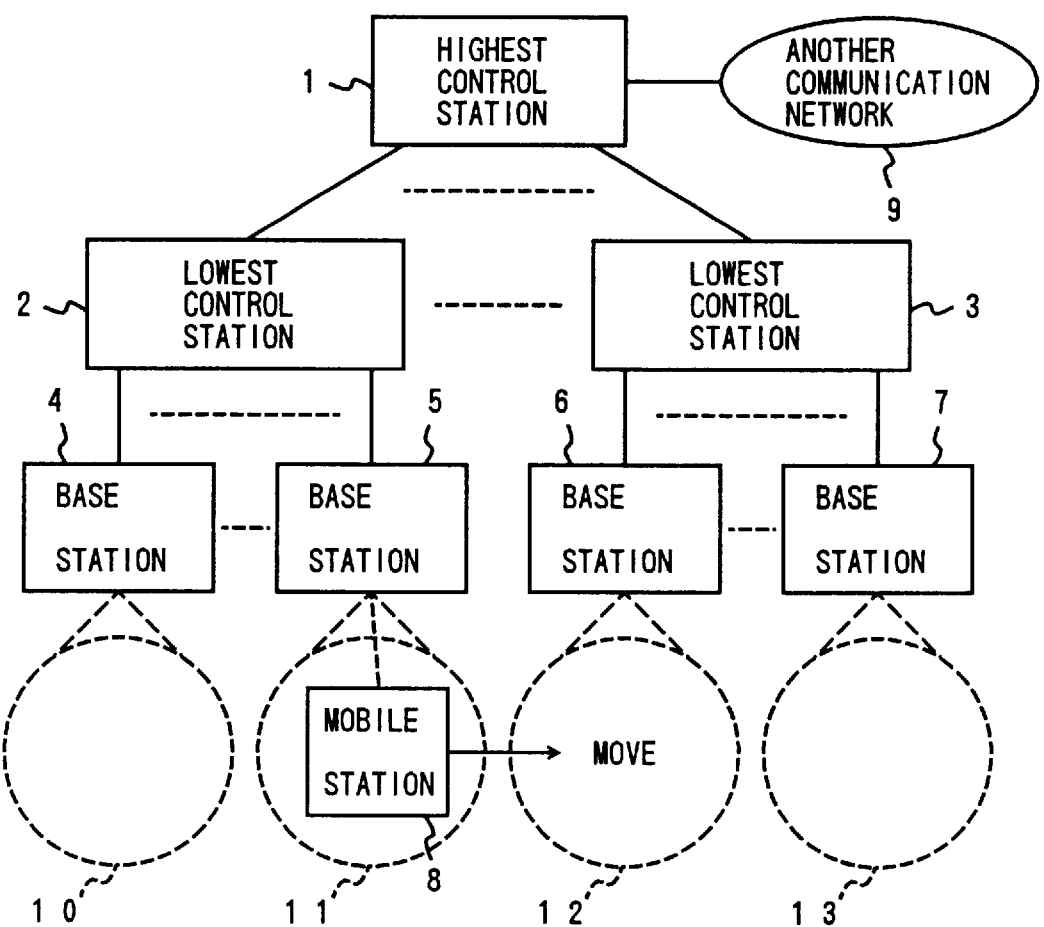
FIG. 1 is a mobile telecommunication network to which the present invention is applied.

FIG. 1 is a mobile telecommunication network to which the present invention is applied. The mobile telecommunication system shown in FIG. 1 has a hierarchical structure. A highest control station 1 is an ATM node (ATM switch) located at the top of the hierarchical structure, and is connected to lowest control stations 2 and 3 located at a lower layer level of the hierarchical structure than the level of the highest control station 1. Hereinafter, the lowest control stations are stations directly connected to the base stations. The highest control station 1 is also connected to another communication network 9. The lowest control stations 2 and 3 are respectively ATM nodes. Although FIG. 1 shows a single hierarchical layer level at which the lowest stations 2 and 3 are located for the sake of simplicity directly beneath the highest control station 1, a plurality of layer levels lower than the top layer level can be provided. In this case, control stations other than the highest and lowest control stations are referred to as intermediate control stations. It should be noted that the intermediate control stations can accommodate base stations in addition to the lowest control stations.

Base stations 4 and 5 are connected to the lowest control station 2, and base stations 6 and 7 are connected to the lowest control station 3.

The base stations 4 through 7 have respective service zones (cells) 10 through 13. In FIG. 1, a mobile station 8 is located in the service zone 11 and can telecommunicate with the base station 5. If the mobile station 8 moves to, for example, the service zone 12, the mobile station 8 performs a hand-over process to telecommunicate with the base station 6 covering the service zone 12.

Figure 2:
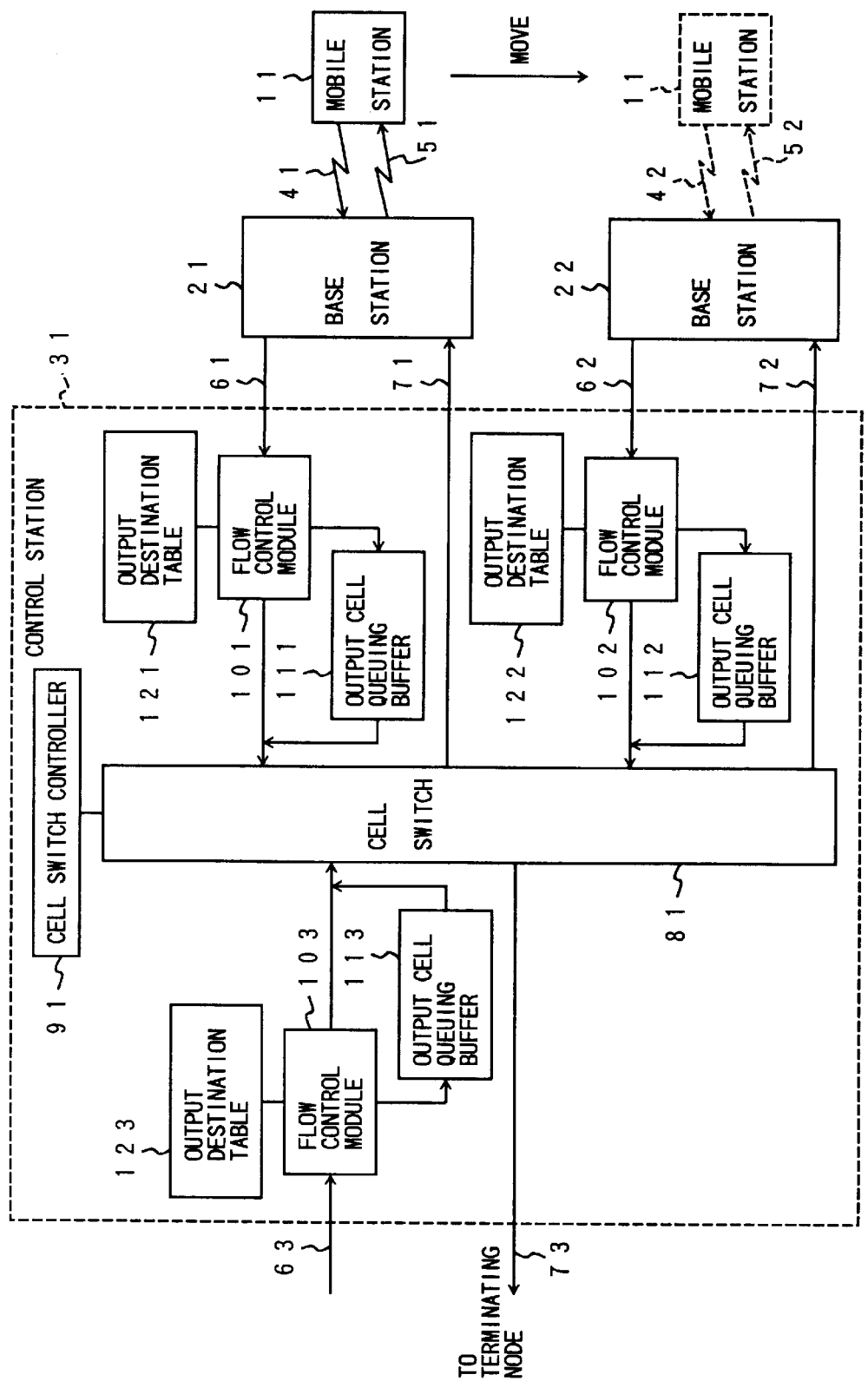
FIG. 2 is a block diagram of a first embodiment of the present invention.

FIG. 2 is a block diagram of the internal structure of a lowest control station 31, which corresponds to any of the lowest control stations 2 and 3 shown in FIG. 1. Base stations 21 and 22 are connected to the lowest control station 31. A mobile station 11 is telecommunicating with the base station 21 via radio channels 41 and 51. The base station 21 and the lowest control station 31 are connected via input and output ATM transmission paths 61 and 71. Similarly, the base station 22 and the lowest control station 31 are connected via input and output ATM transmission paths 62 and 72. The lowest control station 31 is connected to an intermediate or highest control station (that is, an upper control station) via input and output ATM transmission paths 63 and 73. It will now be assumed that a remote station with which the mobile station 11 is communicating is connected to the terminating network (not shown) connected to the ATM transmission paths 63 and 73.

The lowest control station 31 includes a cell switch 81, a cell switch controller 91, and flow control modules 101, 102 and 103 provided respectively to the input ATM transmission paths. Further, the lowest control station 31 includes output cell queuing buffers 111, 112 and 113 respectively provided for the input ATM transmission paths, and output destination tables 121, 122 and 123 respectively provided for the input ATM transmission paths. The output cell queuing buffers 111, 112 and 113 are respectively buffer memories provided in the input ATM transmission paths 61, 62 and 63 and located at the input side of the cell switch 81.

The output destination tables 121, 122 and 123 are respectively provided to the input ATM transmission paths 61, 62 and 63 and located at the input side of the cell switch 81. Each of the output destination tables 121, 122 and 123 can store information concerning an input virtual channel, an output virtual channel and an output ATM transmission path. The flow control modules 101, 102 and 103 can independently access the output destination tables 121, 122 and 123, which can also be accessed by the cell switch 81 and the cell switch controller 91. An input cell has a virtual channel identifier. The above input virtual channel in each of the output destination tables 121, 122 and 123 has a value indicated by the virtual channel identifier of the incoming cell. When the above cell goes out of the flow control module, the virtual channel identifier thereof has a value indicated by the output virtual channel stored in the output destination table.

The flow control modules 101, 102 and 103 monitor the input ATM transmission paths 61, 62 and 63, respectively, and search the output destination tables 121, 122 and 123 by using the virtual channel identifiers of input cells. If the information concerning the output ATM transmission path stored in the output destination tables 121, 122 and 123 indicate "to be queued", the flow control modules 101, 102 and 103 perform a queuing process in which the input cells are sent to and stored in the output cell queuing buffers 111, 112 and 113. If not, the flow control modules 101, 102 and 103 transfer the input cells to the cell switch 81.

Figure 3:
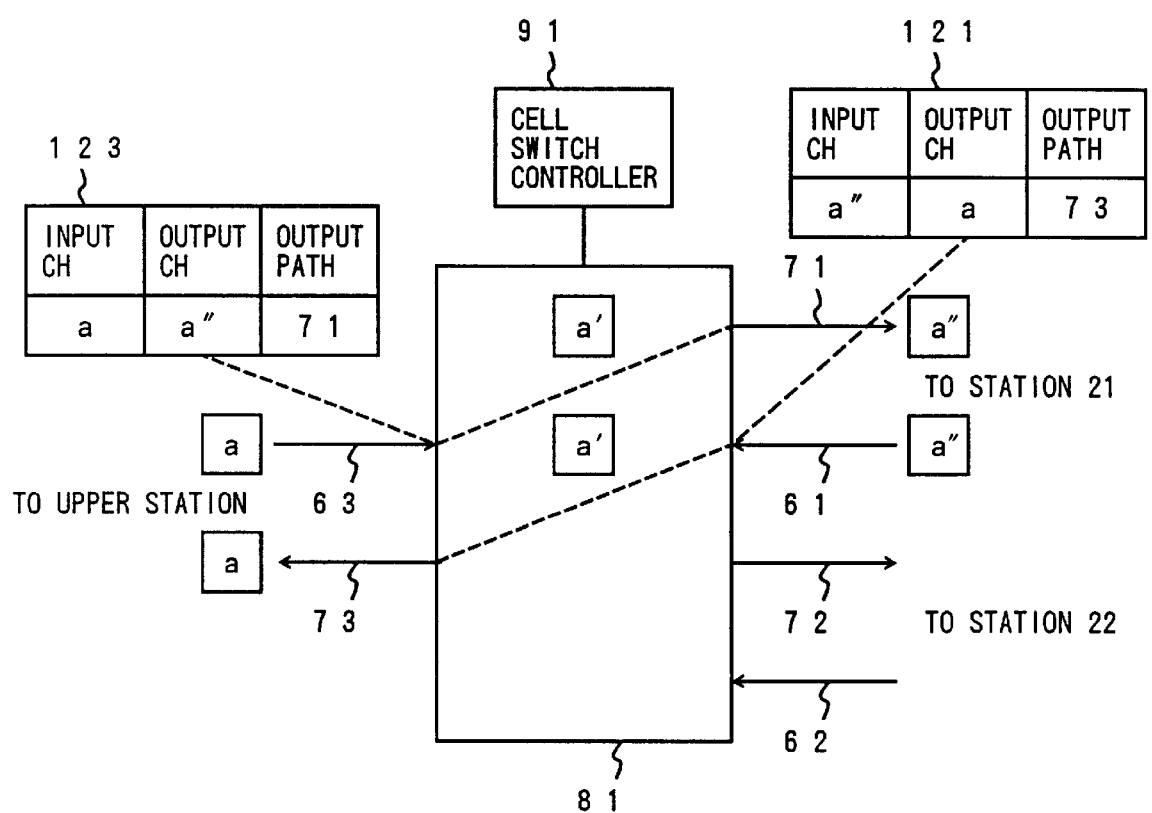
FIGS. 3, 4 and 5 are block diagrams showing an operation of the first embodiment of the present invention.
Figure 4:
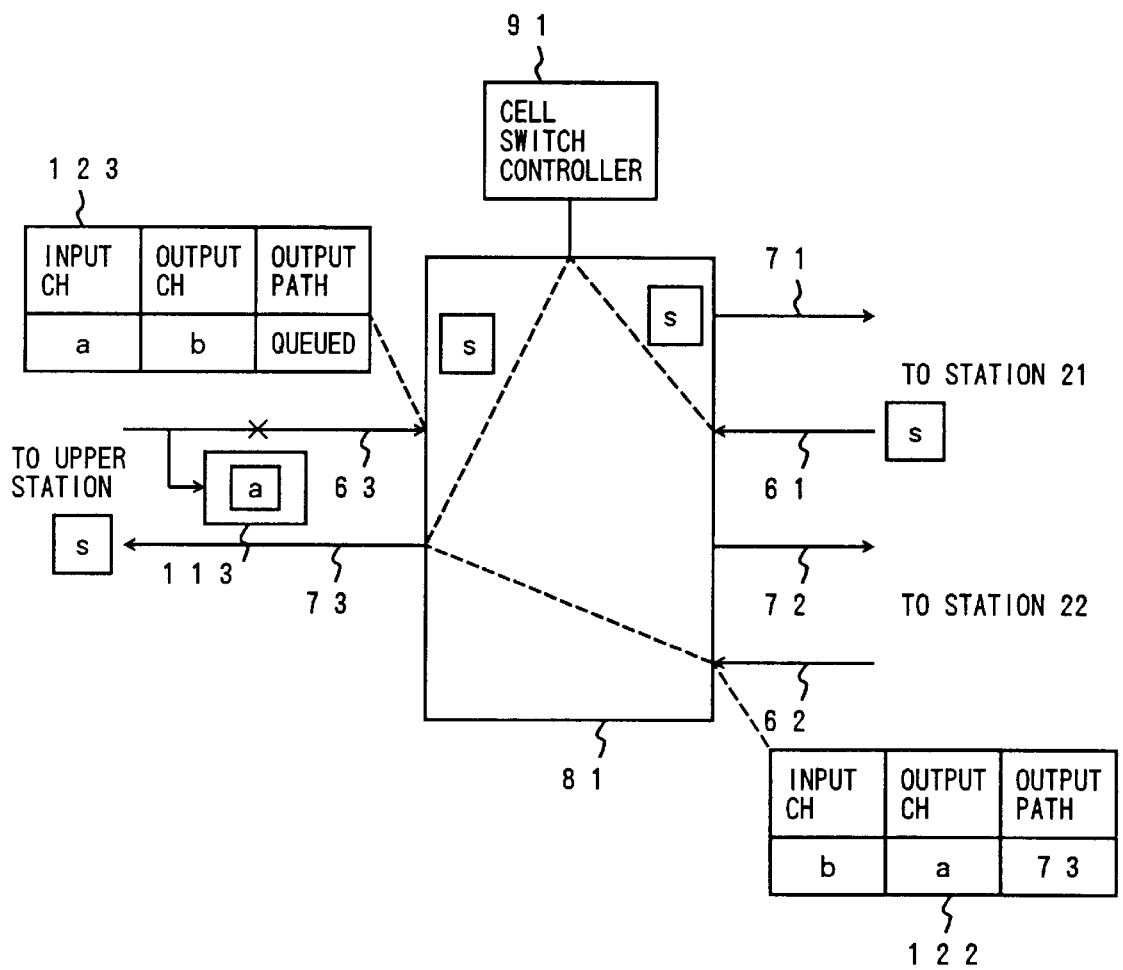
Figure 5:
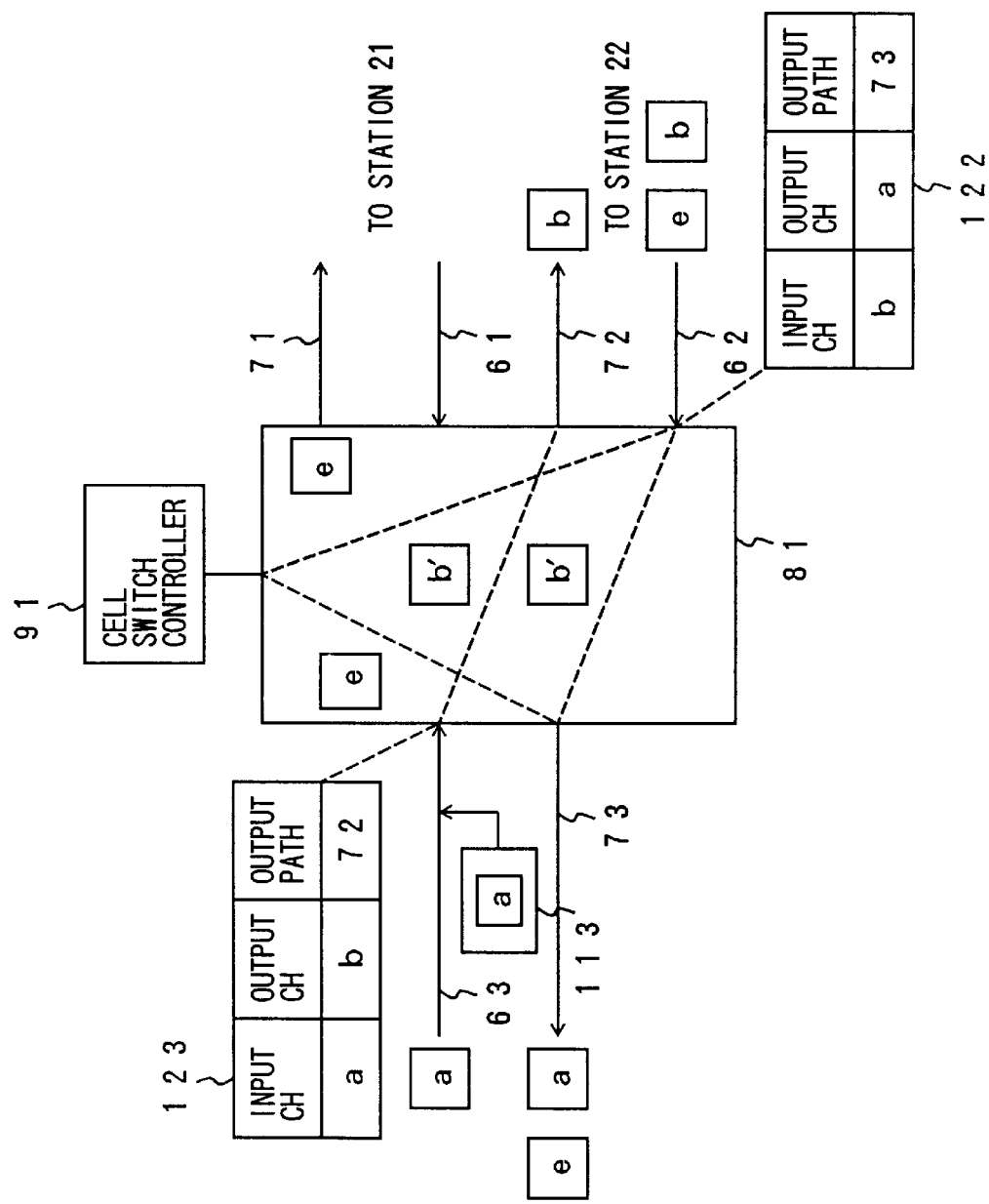

FIGS. 3, 4 and 5 show the flow control at each ATM node. More particularly, FIG. 3 shows a state before the hand-over process is initiated. The base stations 21 and 22 form adjacent radio service zones. The mobile station 11 is located in the radio zone of the base station 21. Symbols (a), (a') and (a") are virtual channels.

It will now be assumed that the mobile station 11 moves to the radio zone of the base station 22. At this time, the mobile station 11 detects a decrease in the receive power level of a given signal (for example, a pilot signal), and requests the handover to the base station 21.

In response to the above request, the base station 21 informs the mobile station 11 that the hand-over destination is the base station 22 (the mobile station 11 should be handed over to the ground station 22). Further, the base station 21 generates a hand-over start cell (s) containing information indicating the new base station 22 and an ATM virtual channel (a") open to the mobile stations. Then, the base station 21 sends the hand-over start cell (s) to the lowest control station 31 via an ATM virtual channel formed in the input ATM transmission path 61 and specifically used for control.

Referring to FIG. 4, the cell switch controller 91 of the lowest control station 31 receives the hand-over start cell (s), and searches the output destination table 121 by using the ATM virtual channel (a41) as a key. Then, the cell switch controller 91 recognizes the ATM virtual channel (a) used to output the cell and the output ATM transmission path 73, as shown in FIG. 3. The cell switch controller 91 controls the cell switch 81 to make a route to an intermediate control station located at a higher layer level than that of the lowest control station 31 or to the highest control station 1 by using an ATM virtual channel formed in the output ATM transmission path 73 and specifically used for control.

The cell switch controller 91 refers to information concerning the new base station 22, and determines that the route to the station 22 be switched in the cell switch 81 of the lowest control station 31. Then, the cell switch controller 91 causes cells directed to the mobile station 11 to be queued in the lowest control station 31. More particularly, the cell switch controller 91 searches the output destination table 123 by using, as a key, the ATM virtual channel (a) of an input cell transferred over the input ATM transmission path 63. Then, the controller 91 writes, into the output destination table 123, information that cells to be transferred over the output transmission path relating to the input channel (a) should be queued, a shown in FIG. 4.

Thus, all cells transferred over the input ATM transmission path 63 and directed to the mobile station 11 are queued in the output cell queuing buffer 113. Further, the cell switch controller 91 prepares a new ATM virtual channel which is to be used to transfer data to the new (destination) base station 22 after the hand-over process is completed.

When the hand-over process is completed, the new base station 22 generates a hand-over end cell (e) including information indicative of the base station 22 and an ATM virtual channel open to the mobile stations. Then, the base station 22 transmits the hand-over end cell over a virtual channel formed in the input ATM transmission path 62 and specifically used for control.

Referring to FIG. 5, the cell switch controller 91 of the lowest control station 31 receives the hand-over end cell (e) transferred over the input ATM transmission path 62, and searches the output destination table 122 by using the ATM virtual channel (b) as a key. Then, the controller 91 recognizes that the ATM virtual channel (a) and the output ATM transmission path 73 should be used to output cells coming from the input ATM transmission path 62. Then, the controller 91 controls the cell switch 81 to make a route to the upper control station connected to the far end of the output ATM transmission path 73 and send the hand-over end cell 83) thereto. Further, when the controller 91 determines, from the information concerning the base station 22, that the route is changed in the cell switch 81 of the lowest control station 31, the controller 91 searches the output destination table 123 by using, as a key, the ATM virtual channel (a) of cells transferred over the ATM transmission path 63. Then, the controller 91 changes the output ATM transmission path information in the output destination table 123 from "to be queued" to "path 72". Thereafter, the cells queued in the output cell queuing buffer 113 are sent to the output ATM transmission path 72, and then the cells transferred over the input ATM transmission path 63 are sent thereto.

Figure 6:
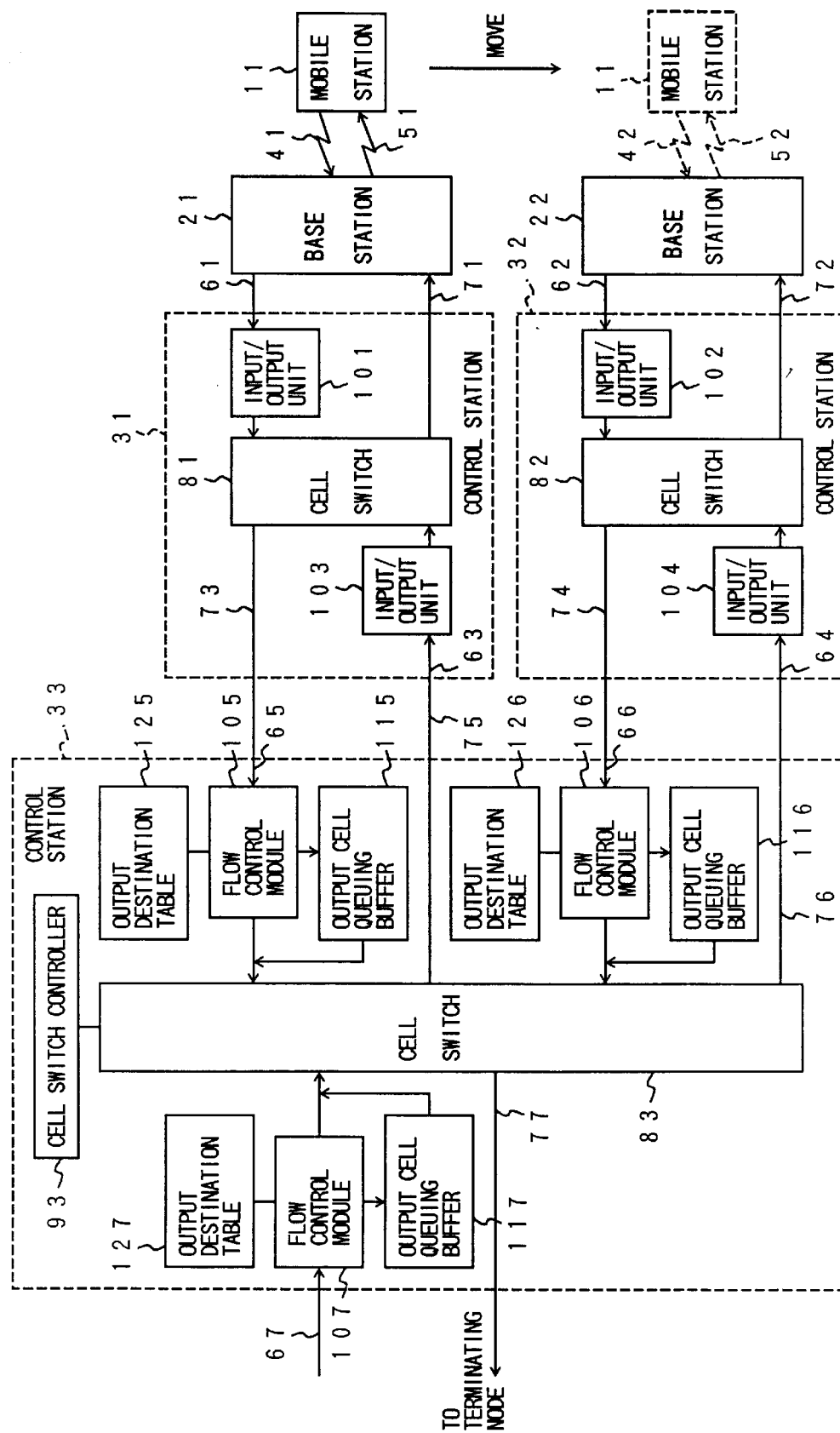
FIG. 6 is a block diagram of a second embodiment of the present invention.

A description will now be given, with reference to FIG. 6, of a second embodiment of the present invention, which relates to a case where the new base station (after the hand-over process) is connected to a control station which differs from that to which the old base station (before the hand-over process) is connected. In FIG. 6, parts that are the same as those shown in the previously described figures are given the same reference numbers.

The mobile station 11 telecommunicates with the base station 21 via the radio channels 41 and 51. The base station 21 is connected to the lowest control station 31 via the input and output ATM transmission paths 61 and 71. The base station 22 is connected to a lower control station 32 via the input and output ATM transmission paths 62 and 72. The lowest control station 31 is connected to an intermediate control station 33 via input and output ATM transmission paths 163 (75) and 73 (65). Similarly, the lowest control station 32 is connected to the intermediate control station 33 via input and output ATM transmission paths 64 (76) and 74

(66). The intermediate control station 33 is connected to an intermediate or highest control station (that is, an upper control station) via input and output ATM transmission paths 67 and 77. A remote station with which the mobile station 11 communicates is connected to the upper control station.

Generally, a control station having n ATM transmission paths accommodates (n-m) base stations, and m other control stations. FIG. 6 shows the simplest configuration.

The control stations 31, 32 and 33 are ATM nodes. Each of input units 101, 102, 103 and 104 shown in FIG. 6 includes a flow control module, an output cell queuing buffer and an output destination table as shown in FIG. 2. The intermediate control station 33 has the same internal structure as that of the lowest control station 31 shown in FIG. 2. That is, the intermediate control station 33 includes flow control modules 105–107, output cell queuing buffers 115–117, output destination tables 125–127, a cell switch 83 and a cell switch controller 93.

A description will now be given, with reference to FIGS. 7 and 8, of an operation of the second embodiment of the present invention. The base stations 21 and 22 form adjacent radio zones. The mobile station 11 which is now located in the radio zone of the base station 21 moves to the radio zone of the base station 22. At this time, the hand-over process is carried out. The base station 21 instructs the mobile station 11 to hand-over to the base station 22. Then, the base station 21 generates the hand-over start cell containing information indicating the new base station 22 and an ATM virtual channel open to the mobile stations. Then, the base station 21 sends the hand-over start cell (s) to the lowest control station 31 via an ATM virtual channel formed in the input ATM transmission path 61 and specifically used for control.

Figure 7:
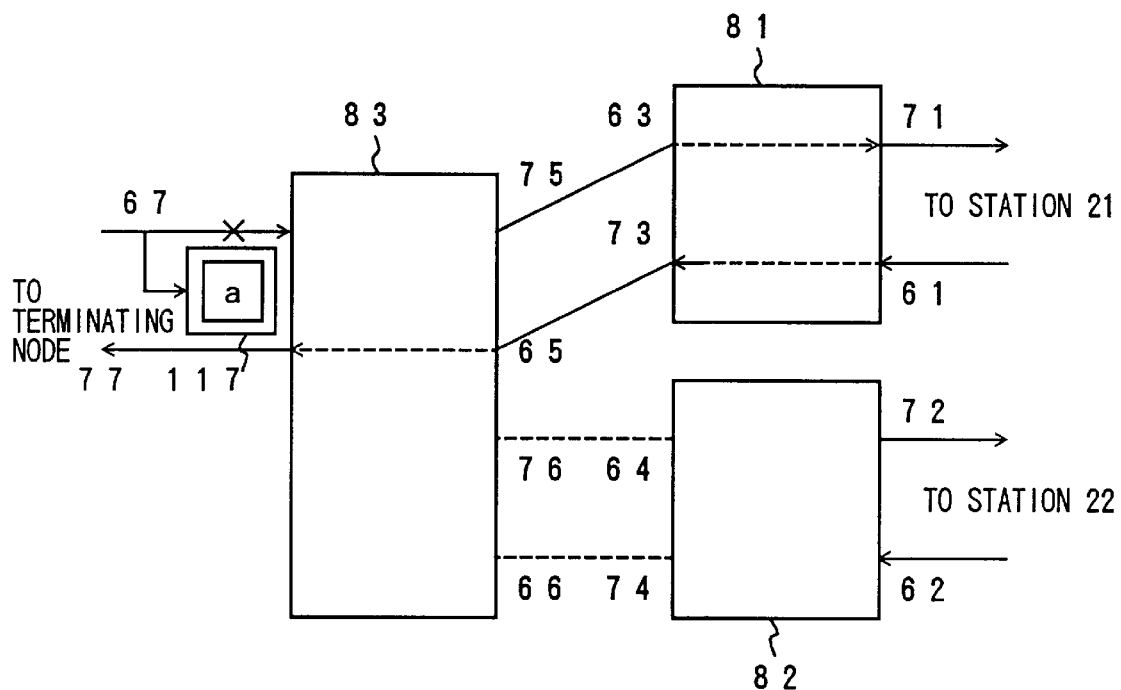
FIGS. 7 and 8 are block diagrams showing an operation of the second embodiment of the present invention.
Figure 8:
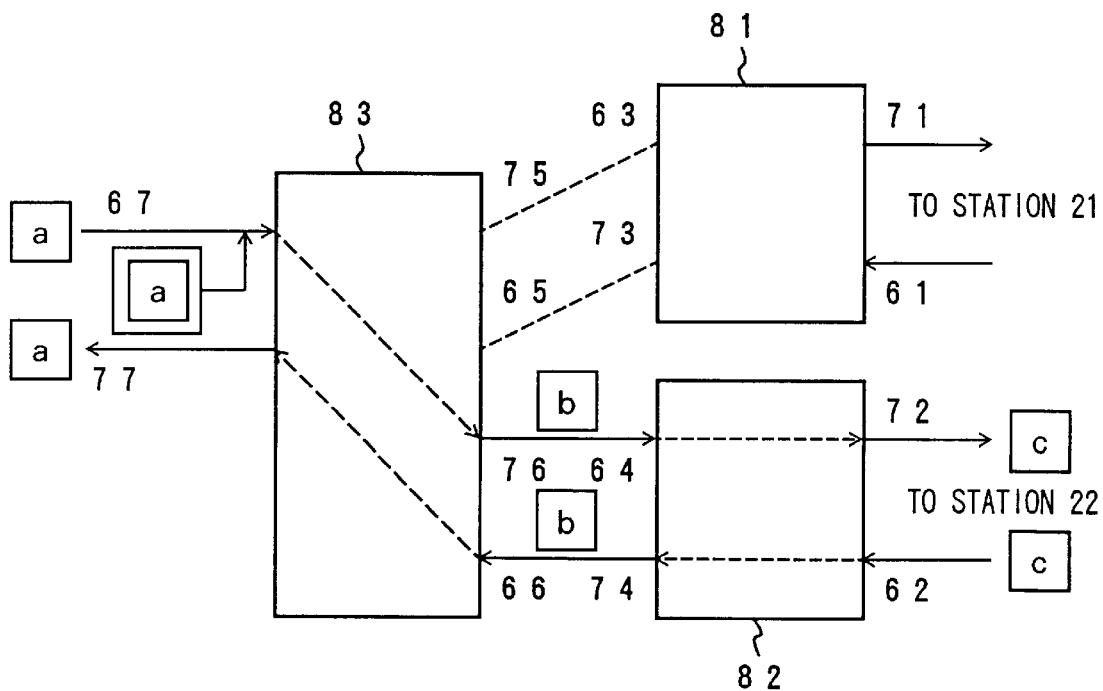

Referring to FIG. 7, the cell switch controller (not shown) of the lowest control station 31 receives the hand-over start cell, and searches the output destination table of the input/output unit 101 by using the ATM virtual channel in the hand-over start cell as a key. Then, the cell switch controller 91 recognizes the ATM virtual channel (a) used to output the cell and the output ATM transmission path 73. The cell switch controller controls the cell switch 81 to make a route to the intermediate control station 33 by using an ATM virtual channel formed in the output ATM transmission path 73 and specifically used for control. Further, the controller of the lowest control station 31 determines that the new route established after the hand-over process does not pass through the lowest control station 31, and does not perform any particular process. The virtual channel in the output ATM transmission path 71 is maintained until all data from the upper station has been sent to the mobile station 11.

The cell switch controller 93 of the intermediate control station 33 receives the hand-over start cell transmitted over the input ATM transmission path 65 and searches the output destination table 125 by using, as a key, the ATM virtual channel provided therein, and recognizes the ATM virtual channel and output ATM transmission path (77) via which the cells from the mobile station 11 should be output. The cell switch controller 93 sends the hand-over start cell via an ATM virtual channel formed in the output ATM transmission path 77 and specifically provided for control. Further, the controller 93 determines that the route directed to the mobile station 11 should be changed in the intermediate control station 33. Then, the controller 93 makes cells directed to the mobile station 11 be stored in the output cell queuing buffer 117 in the same manner as that of the first embodiment of the present invention.

Then, cells (a) input via the input ATM transmission path 67 are queued in the output cell queuing buffer 117 of the intermediate control station 33. Further, the controller 93 sets up a virtual channel which is coupled to the new base station 22 via the lowest control station 32 and which is to be used after the hand-over is completed.

When the hand-over is completed, the new base station 22 generates the hand-over end cell including information indicating the base station 22 and the ATM virtual channel open to the mobile stations, and sends it to the lowest control station 32 via a virtual channel formed in the input ATM transmission path 62 and specifically used for control.

The cell switch controller 92 of the lowest control station 32 receives the hand-over end cell, and searches the output destination table of the input/output unit 102 by using, as a key, the virtual channel. Then, the controller 92 recognizes the virtual channel and the output ATM transmission path to be used to output cells. Further, the controller 92 sends the hand-over end cell to the intermediate control station 33 via a virtual channel provided in the output ATM transmission path 74 and specifically used for control.

The cell switch controller 93 of the intermediate control station 33 receives the hand-over end cell transmitted via the input ATM transmission path 66, and searches the output destination table 126 by using the ATM virtual channel defined therein as a key. Thus, the controller 93 recognizes the virtual channel and the output ATM transmission path 77 to be used to output cells. The controller 93 sends the hand-over end cell to the upper control station via the output ATM transmission path 77. Further, the controller 93 determines, from the information indicative of the new base station 22, that the route to the mobile station 11 is changed in the intermediate control station 33. Then, the controller 93 searches the output destination table 127 by using, as a key, the output ATM transmission path 77 and the virtual channel (a) to be used to output cells (that is, the virtual channel (a) via which the cells are input via the input ATM transmission path 66. Then, the controller 93 changes the output ATM transmission path information in the output destination table 127 to the output ATM transmission path 76 from "to be queued". Then, the cells input over the input ATM transmission path 67 are output to the output ATM transmission path 76.

The hand-over start cell and the hand-over end cell are routed in the control stations and are finally transferred to a terminating control station in which the remote station with which the mobile station 11 communicates is accommodated. Each ATM node determines, from the hand-over start cell, which control station should switch the route in order to continue to communicate with the mobile station 11 which moves to the new radio zone. If each control station determines that an upper station should perform such route switching, these lower stations do not carry out any switching. If a control station determines that it should perform the route switching, the control station operates as has been described above. If each control station determines that a lower station should perform the route switching, it queues cells, so that the cells are queued in a distributed formation.

A more detailed description of the operation of the first and second embodiments of the present invention will be described below.

Figure 9A:
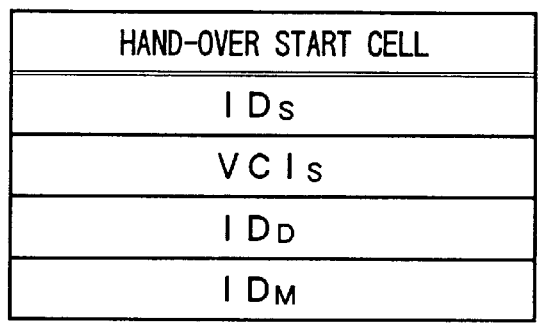
FIGS. 9A, 9B and 9C are diagrams showing control cells used in embodiments of the present invention.
Figure 9B:
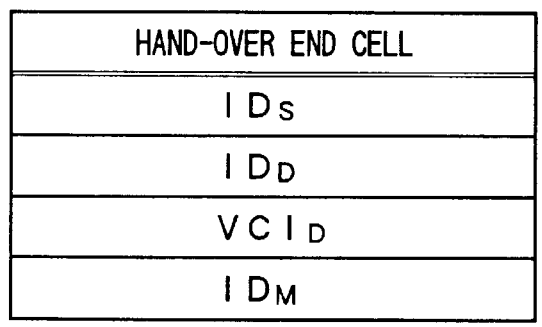
Figure 9C:
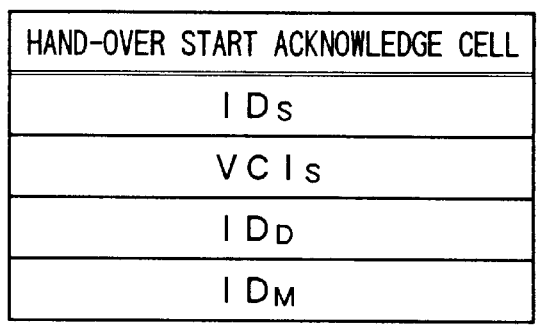

FIG. 9A shows the aforementioned hand-over start cell, and FIG. 9B shows the aforementioned hand-over end cell. FIG. 9C shows a hand-over start acknowledge cell.

As shown in FIG. 9A, the hand-over start cell includes a hand-over source identifier $ID_S$, a virtual channel $VCI_S$ of the hand-over source, a hand-over destination identifier $ID_D$, and a mobile station identifier $ID_M$. As shown in FIG. 9B, the hand-over end cell includes, the hand-over source identifier $ID_S$, the hand-over station identifier $ID_D$, a virtual channel $VCI_D$ of the hand-over destination, and the mobile station identifier $ID_M$. The start acknowledge cell shown in FIG. 9C includes the same identifiers as those of the hand-over start cell. The above cells are referred to as control cells generally.

Figure 10A:
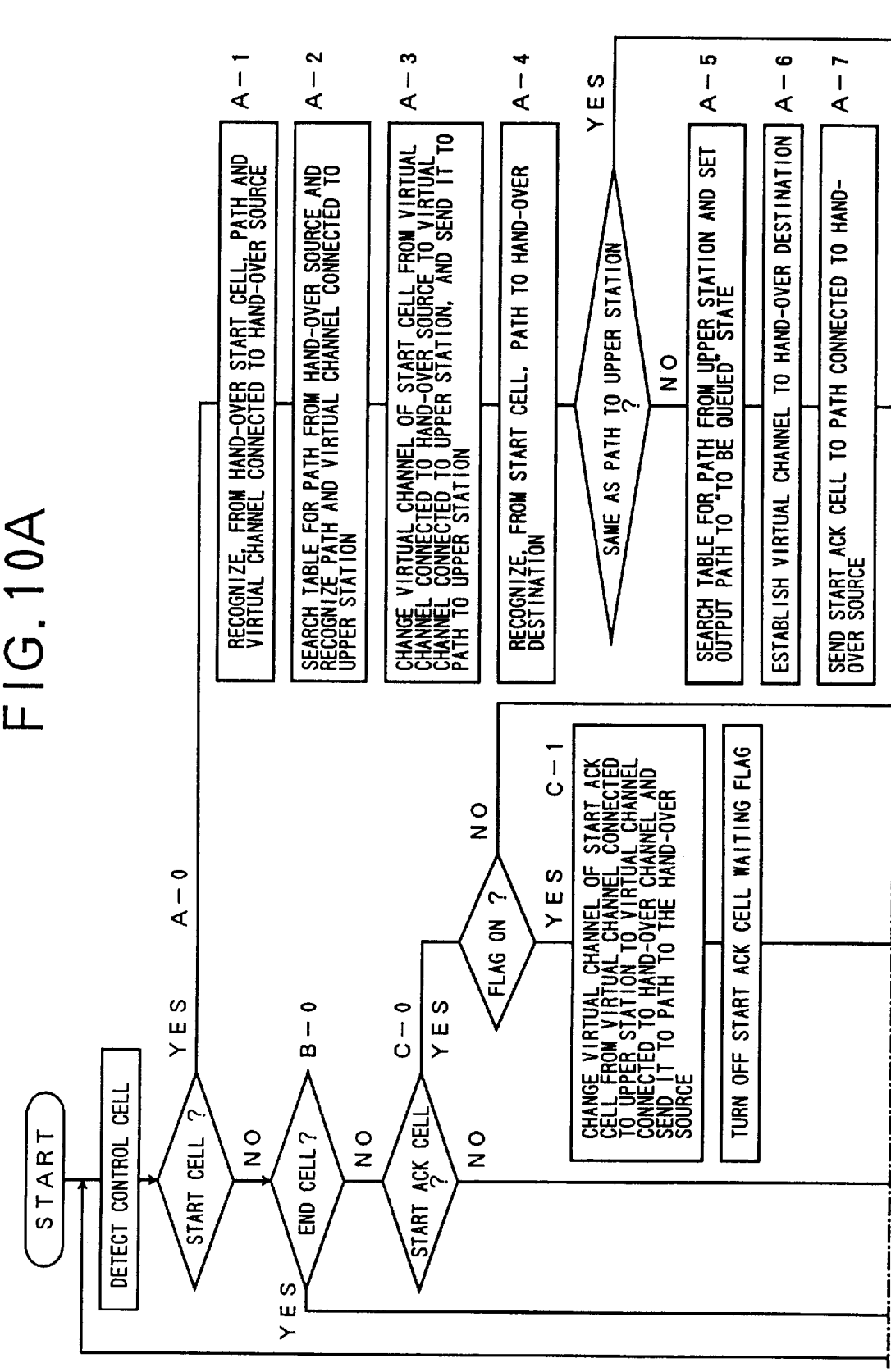
FIGS. 10A and 10B are combined.
Figure 10B:
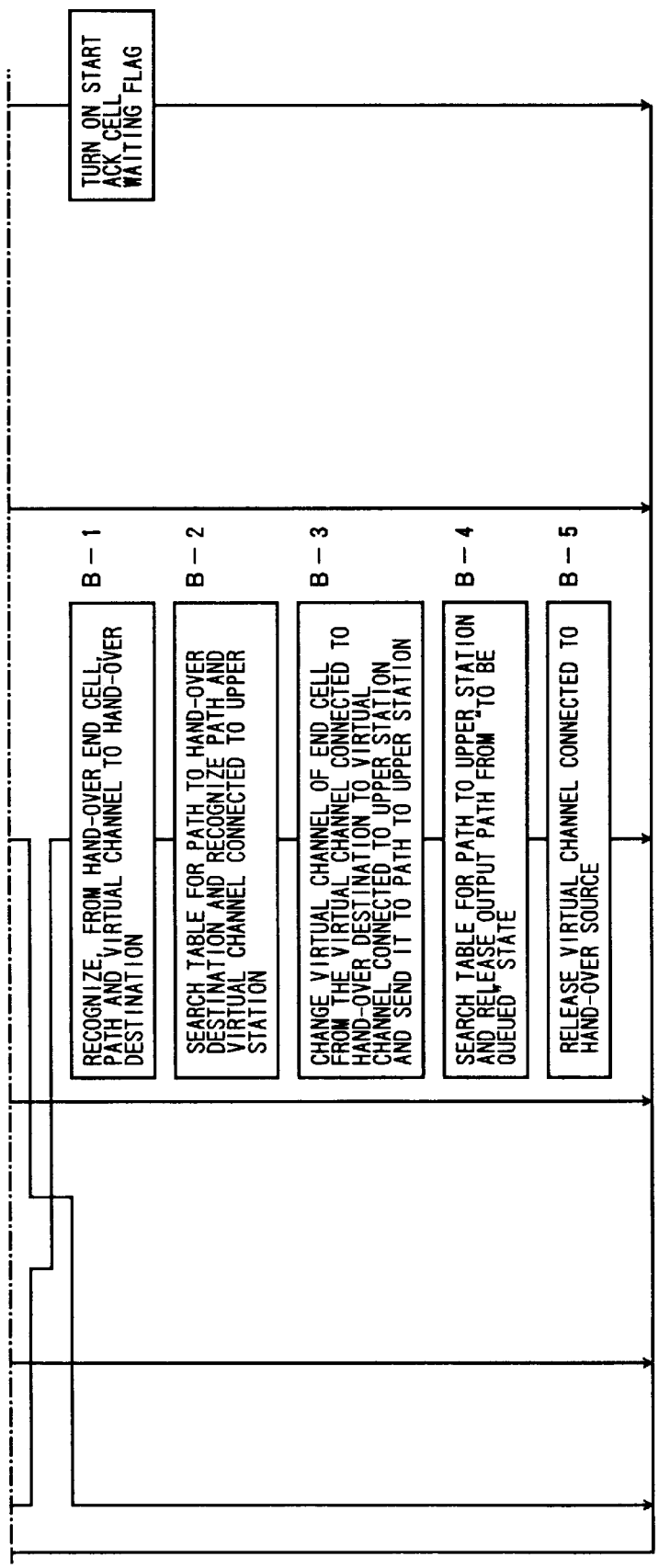

FIGS. 10A and 10B are flowcharts of the operation of each of the cell switch controllers 91 and 93. The following description will be given as the operation of the cell switch controller 91. The steps given labels "A-n" (n=0, 1, 2, . . . ) are executed when the hand-over start cell is received. The steps given labels "B-n" are executed when the hand-over end cell is received. The steps given labels "C-n" are executed when the hand-over start acknowledge cell is received.

Figure 11:
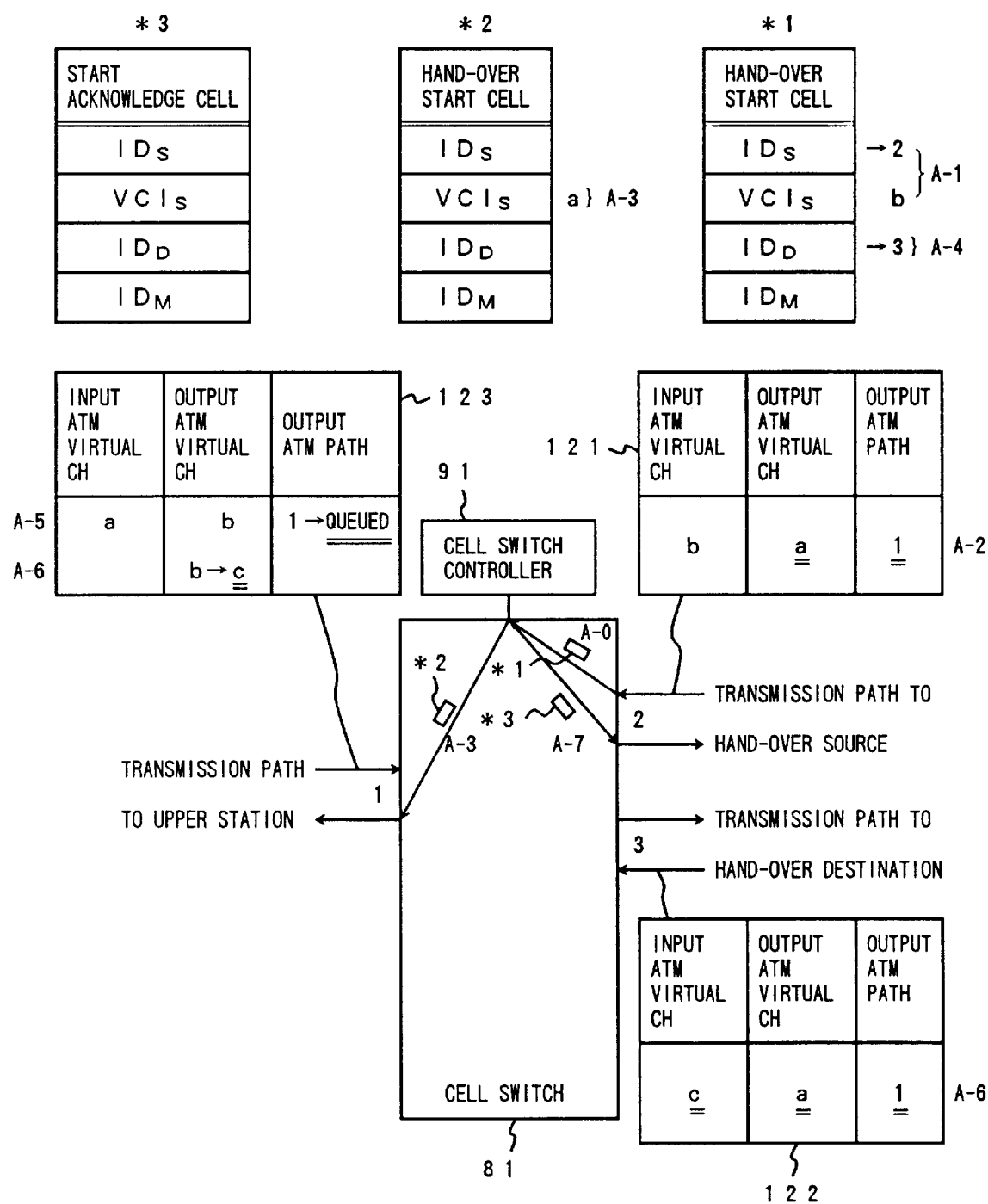
FIG. 11 is a block diagram of an operation of the first and second operations carried out when a hand-over start cell is detected.

First, a description will be given of the steps with labels "A-n" by further referring to FIG. 11, in which processes corresponding to the steps "A-n" are indicated by using the same labels. When the cell switch controller 91 of the lowest control station detects a control cell, it determines whether the received control cell is the hand-over start cell. When the result is affirmative (A-0), the controller 91 recognizes, from the hand-over start cell, the ATM transmission path (2) connected to the hand-over source (ATM transmission path) and the virtual channel (b) thereto (A-1). Next, the controller 91 searches the output destination table 121, and recognizes the output ATM transmission path (1) to the highest or intermediate control station (that is, an upper control station) and the virtual channel (a) thereto (A-2). Then, the controller 91 changes the virtual channel of the hand-over start cell from the original value (b) to the value (a) of the upper control station, and sends the hand-over start cell to the output ATM transmission path 1 (A-3). Then, the controller 91 recognizes the output ATM transmission path (3) connected to the hand-over destination from the hand-over start cell (A-4).

The controller 91 determines whether the ATM transmission path recognized from the hand-over start cell is the same as the ATM transmission path towards an upper control station. If the answer is YES, the controller 91 turns ON a start acknowledge cell waiting flag. In this case, the control station 31 equipped with the controller 91 does not switch the route. If the answer is NO, the controller 91 searches the output destination table 123 provided to the ATM transmission path connected to the upper control station, and sets the output transmission path information in the table 123 to "to be queued" (A-5). Then, the controller 91 establishes a virtual channel connected to the hand-over destination (A-6). In this case, the output channel information of the output destination table 123 is changed to (c) from (b). Further, the output destination table 122 is set as shown in FIG. 11. Then, the controller 91 sends the start acknowledge cell to the ATM transmission path connected to the hand-over source (A-7).

Figure 12:
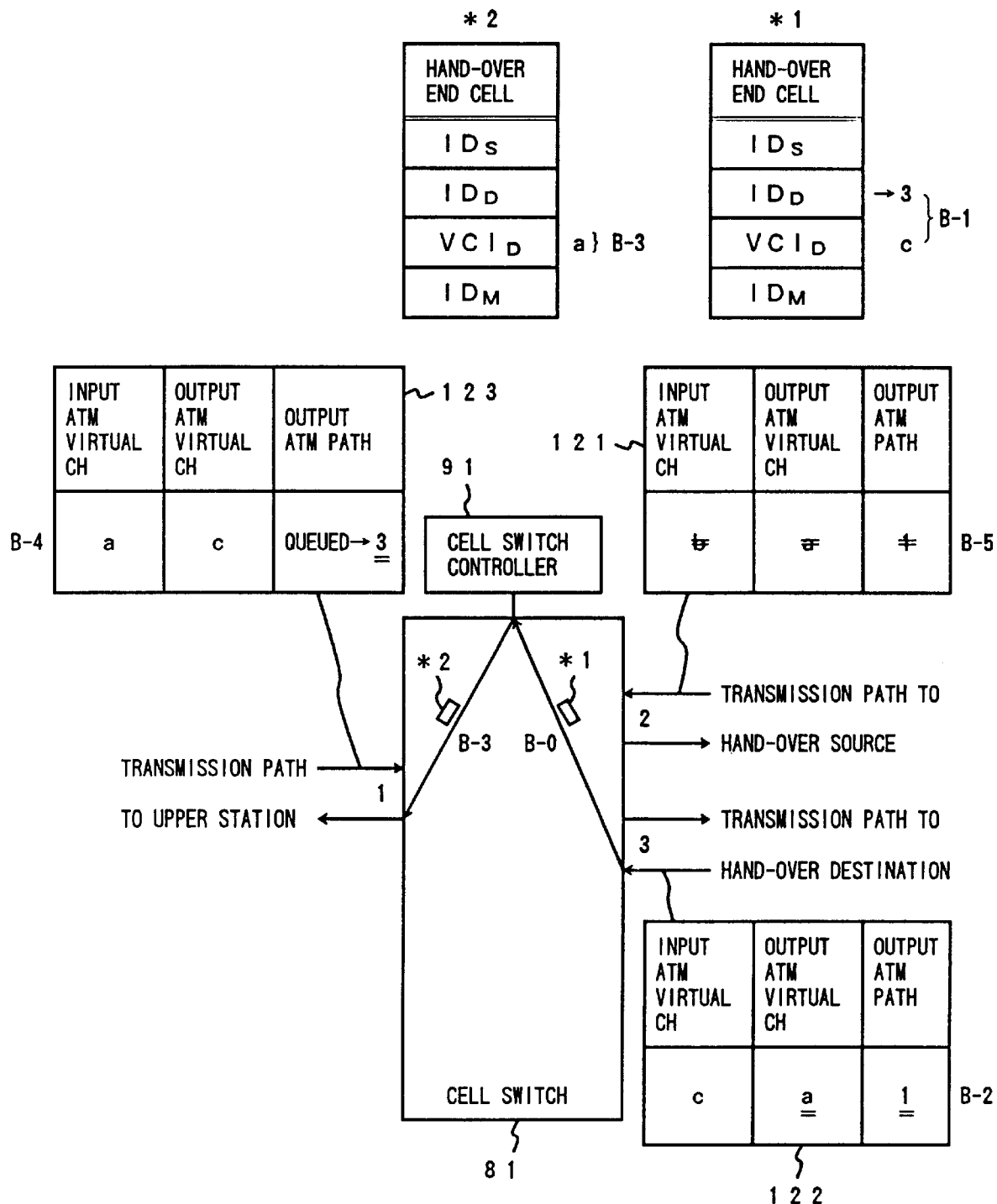
FIG. 12 is a block diagram of an operation of the first and second operations carried out when a hand-over end cell is detected.

When the controller 91 receives the hand-over end cell (B-0), the controller recognizes, therefrom, the ATM transmission path (3) and the virtual channel (c) directed to the hand-over destination (B-1), as shown in FIG. 12. The controller 91 searches the output destination table 122 of the hand-over destination, and recognizes the ATM transmission path (1) and the virtual channel (a) directed to the upper control station (B-2). The controller 91 changes the virtual channel of the hand-over destination in the hand-over end cell to the virtual channel (a) of the upper station, and sends it to the ATM transmission path connected to the upper station (B-3). Then, the controller 91 searches the output destination table 123 of the ATM transmission path 1 connected to the upper station, and sets the output transmission path information from "to be queued" to the ATM transmission path (3) (B-4). Then, the controller 91 releases the virtual channel connected to the hand-over source (B-5).

When the controller 91 receives the hand-over start acknowledge cell (C-0), it determines whether the start acknowledge cell waiting flag is ON. When the answer is YES, the controller 91 changes the virtual channel in the start acknowledge cell from the virtual channel connected to the upper control station to the virtual channel connected to the hand-over source, and sends it to the ATM transmission path to the hand-over source (C-1). Then, the controller 91 turns OFF the start acknowledge cell waiting flag.

Figure 13:
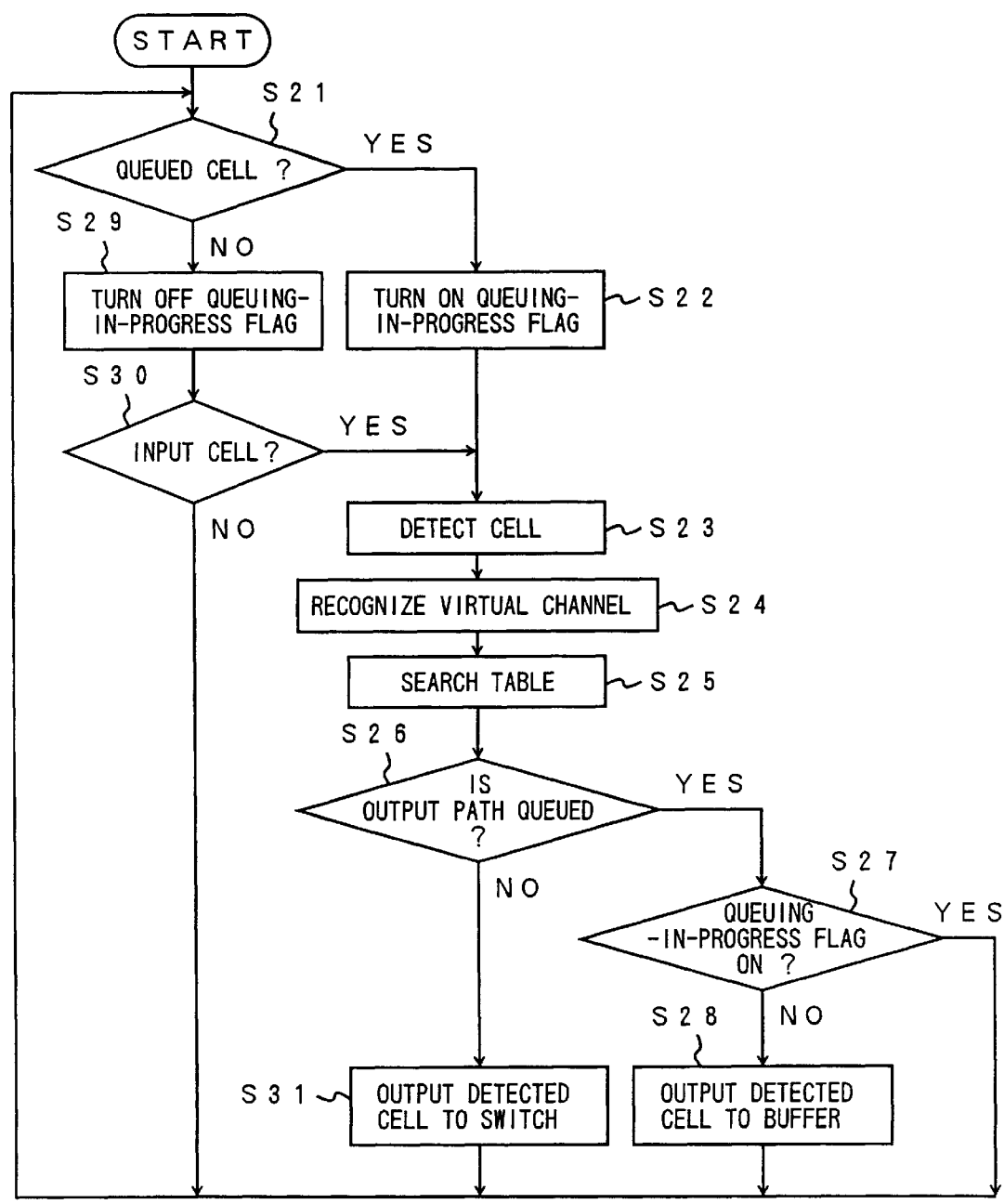
FIG. 13 is a flowchart of an operation of a flow control module used in the first and second embodiments of the present invention.

FIG. 13 is a flowchart of the operation of each of the flow control modules 101–107. The flow control module determines, at step S21, whether there is a cell queued in the corresponding output cell queuing buffer. When the answer is NO, the flow control module turns OFF a queuing-in-progress flag at step S29, and proceeds with step S30. When the answer of step S30 is NO, the process returns to step S21. When the answer at step S30 is YES, the process proceeds with step S23. When the flow control module determines, at step S21, that there is a cell queued in the output cell queuing buffer, the flow control module turns ON the queuing-in-progress flag at step S22, and proceeds with the step S23.

The flow control module detects a cell at step S23, and recognizes the virtual channel thereof at step S24. Then, the flow control module searches the output destination table at step S25, and determines whether cells to be output to the output ATM transmission path should be queued at step S26. When the answer is NO, the flow control module outputs the cell detected at step S23 to the cell switch at step S31. When the answer of step S26 is YES, the flow control module determines, at step S27, whether or not the queuing-in-progress flag is ON. When the answer of step S27 is YES, the flow control module returns to step S21. When the answer of step S27 is NO, the flow control module writes the cell detected at step S23 in the output cell queuing buffer.

A description will now be given of a third embodiment of the present invention. The third embodiment of the present invention is made taking into consideration the following. The aforementioned first and second embodiments of the present invention can prevent cells from being lost during the hand-over process. When the queuing is released, the queued cells are read from the output destination buffer. At this time, it is desired that the cells be transferred at a bit rate higher than that used in the normal operation (at the time of setting up a call) in order to release the control station (ATM node) from the cell queuing state as soon as possible. If the transmission band used to transfer the queued cells at a high bit rate exceeds the available capacity in the ATM transmission path, a congestion will occur. Hence, it is necessary to allocate the transmission band to ensure a margin and thus prevent occurrence of a congestion in the ATM node. Simultaneously, it is necessary to control the bit rate to prevent the bit rate from exceeding the allocated band. Additionally, it is necessary to limit the setting of a margin during a time as short as possible because it decreases the channel efficiency. The third embodiment of the present invention is made taking into account the above.

Figure 14:
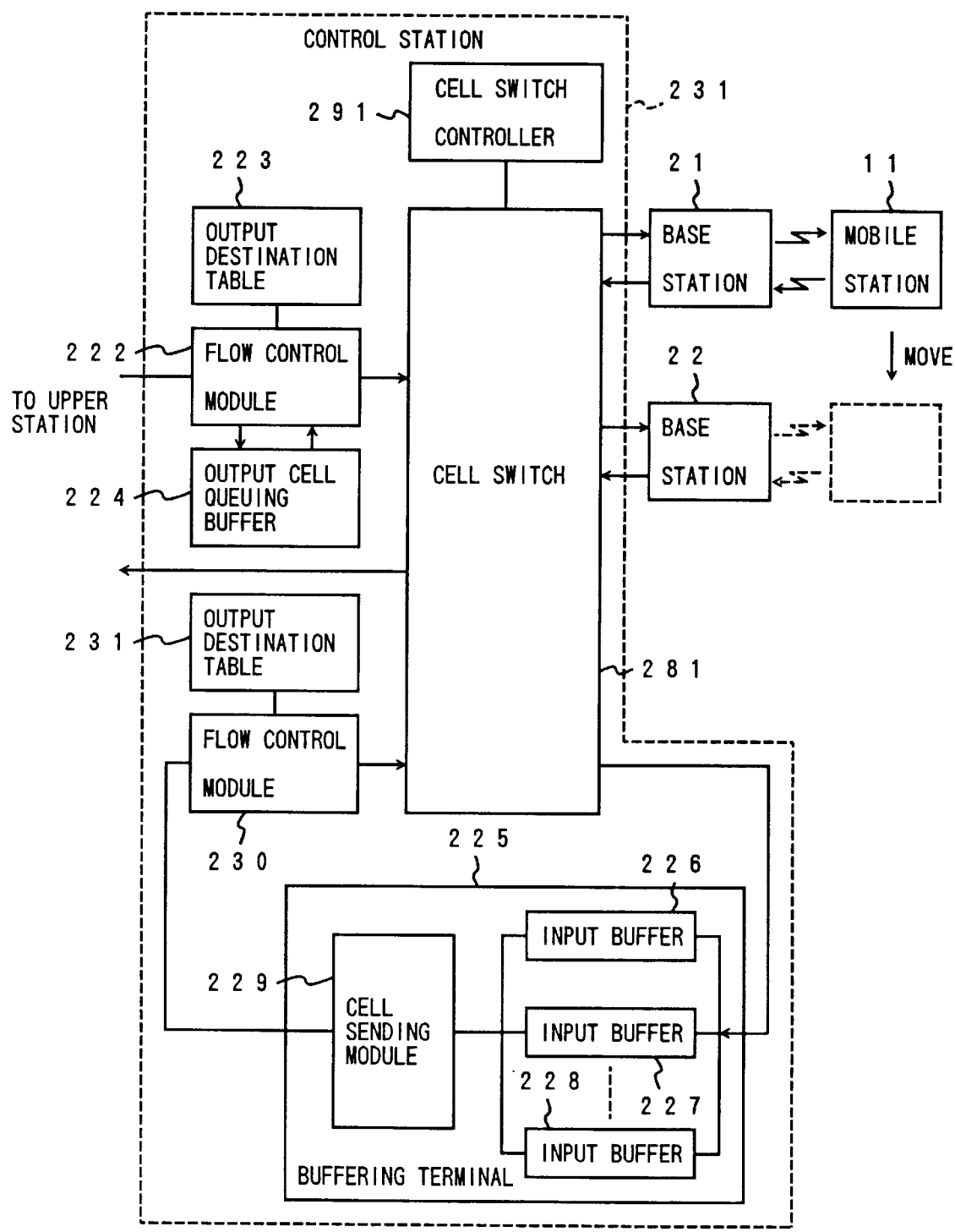
FIG. 14 is a block diagram of a third embodiment of the present invention.

FIG. 14 is a block diagram of the third embodiment of the present invention. A lowest control station 231 accommodates the base stations 21 and 22 via input and output ATM transmission paths, and is connected to an upper control station (not shown) via input and output ATM transmission paths. The control station 231 includes a cell switch 281, a cell switch controller 291, a flow control module 222, an output destination table 223, and an output cell queuing buffer 224. Further the control station 231 includes a flow control module 230, and an output destination table 231.

The output cell queuing buffer 224 is provided in the input ATM transmission cell from the upper control station and located at the input side of the cell switch 281. The output destination tables 223 and 231 are provided in the respective input ATM transmission paths and located at the input side of the cell switch 281. By accessing the output destination tables 223 and 231 by using the ATM virtual channel identifiers of the input cells, information concerning the virtual channel identifiers and the output ATM transmission paths used when the input cells pass through the cell switch 281 can be searched for. The flow control modules 222 and 230 can search the output destination tables 223 and 231, which can also be searched by the cell switch controller 291.

The input ATM transmission paths from the base stations 21 and 22 are provided with input units (not shown) which are the same as those shown in FIG. 6.

The flow control module 222 monitors the input ATM transmission path, and searches the output destination table 223 by the ATM virtual channel identifier of the input cell. If the output ATM transmission information in the table 223 indicates "to be queued", the flow control module 222 causes the input cell to be stored in the output cell queuing buffer 223. If not, the virtual channel identifier of the input cell is changed to one to be used to pass through the cell switch 281, and the input cell is then sent to the cell switch 281. Information cell used for a connection control executed at the time of setting up a call is sent to the cell switch controller 291 via the cell switch 281. When the output cell queuing buffer 224 is released from "to be queued", the cells stored in the output cell queuing buffer 224 are read therefrom and transferred to the cell switch 281 at a set bit rate.

The control station 231 is equipped with a buffering terminal 225, which includes input buffers 226, 227 and 228, and a cell sending module 229. The input buffers 226, 227 and 228 are respectively buffer memories having the FIFO formation. The cell sending module 229 sends the cells stored in the input buffers 226, 227 and 228 at bit rates which can be set for the respective virtual channels.

Figure 15:
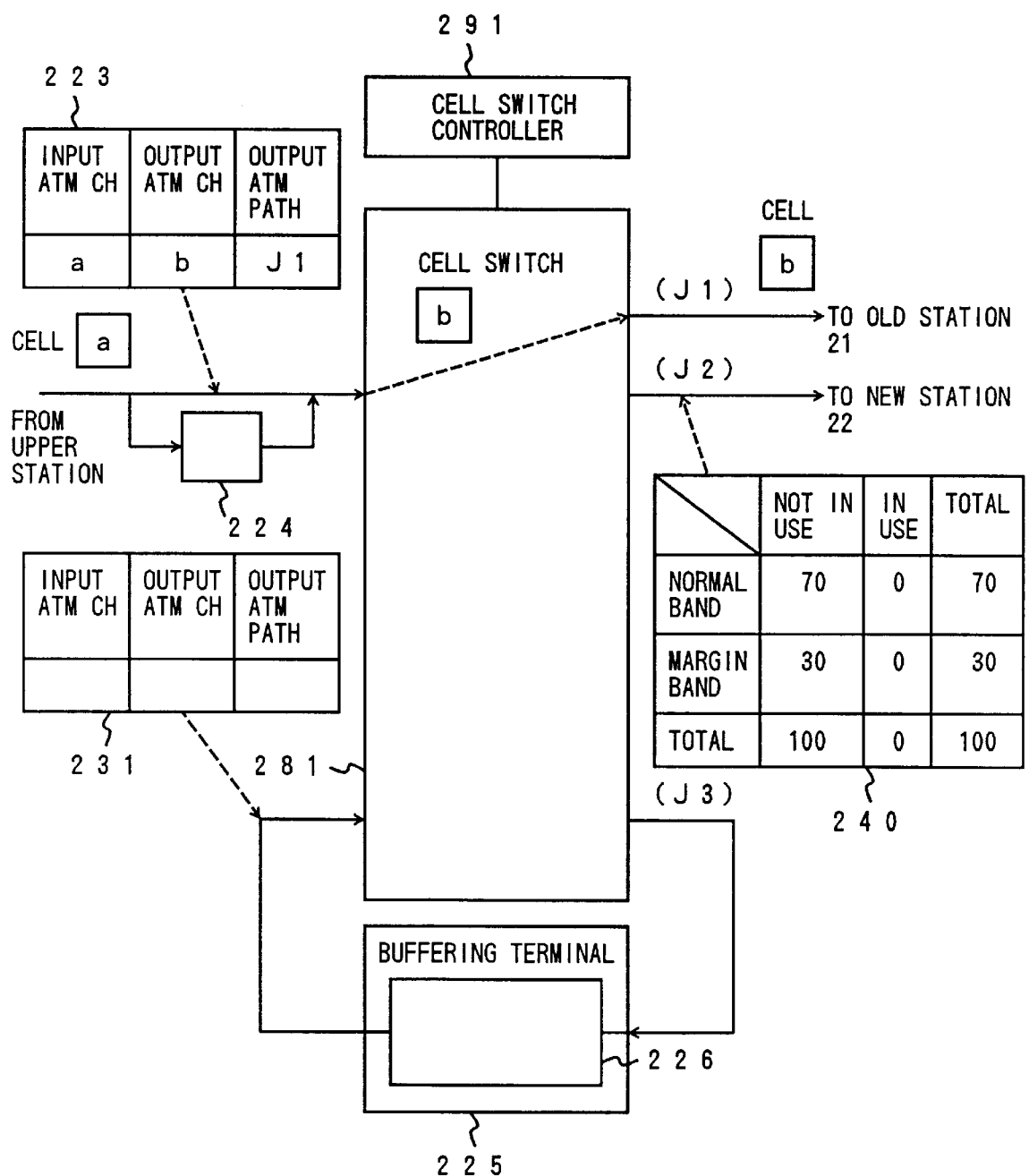
FIGS. 15, 16, 17, 18, 19 and 20 are block diagrams showing an operation of the third embodiment of the present invention.

A description will now be given, with reference to FIGS. 15 through 20, of an operation of the third embodiment of the present invention. FIG. 15 shows a state observed when the hand-over is carried out. The base stations 21 and 22 form the adjacent radio zones, and the mobile station 11 is now located in the radio zone of the base station 21. A cell is input to the cell switch 281 via a virtual channel (a) in the input ATM transmission path. A cell is output via a virtual channel (b) in an output ATM transmission path J1. When the mobile station 11 moves to the radio zone of the base station 22, the hand-over is carried out. It will be assumed that "70" (percentage or the actual bit rate of the whole band ("100") of an output transmission path J2 is assigned to a normal band and "30" thereof is assigned to a margin band. The control station 231 has a band management table 240 shown in FIG. 15, which is controlled by the cell switch controller 291. It will further be assumed that the normal band and the margin band are not used at all, as shown in the band management table 240.

Figure 16:
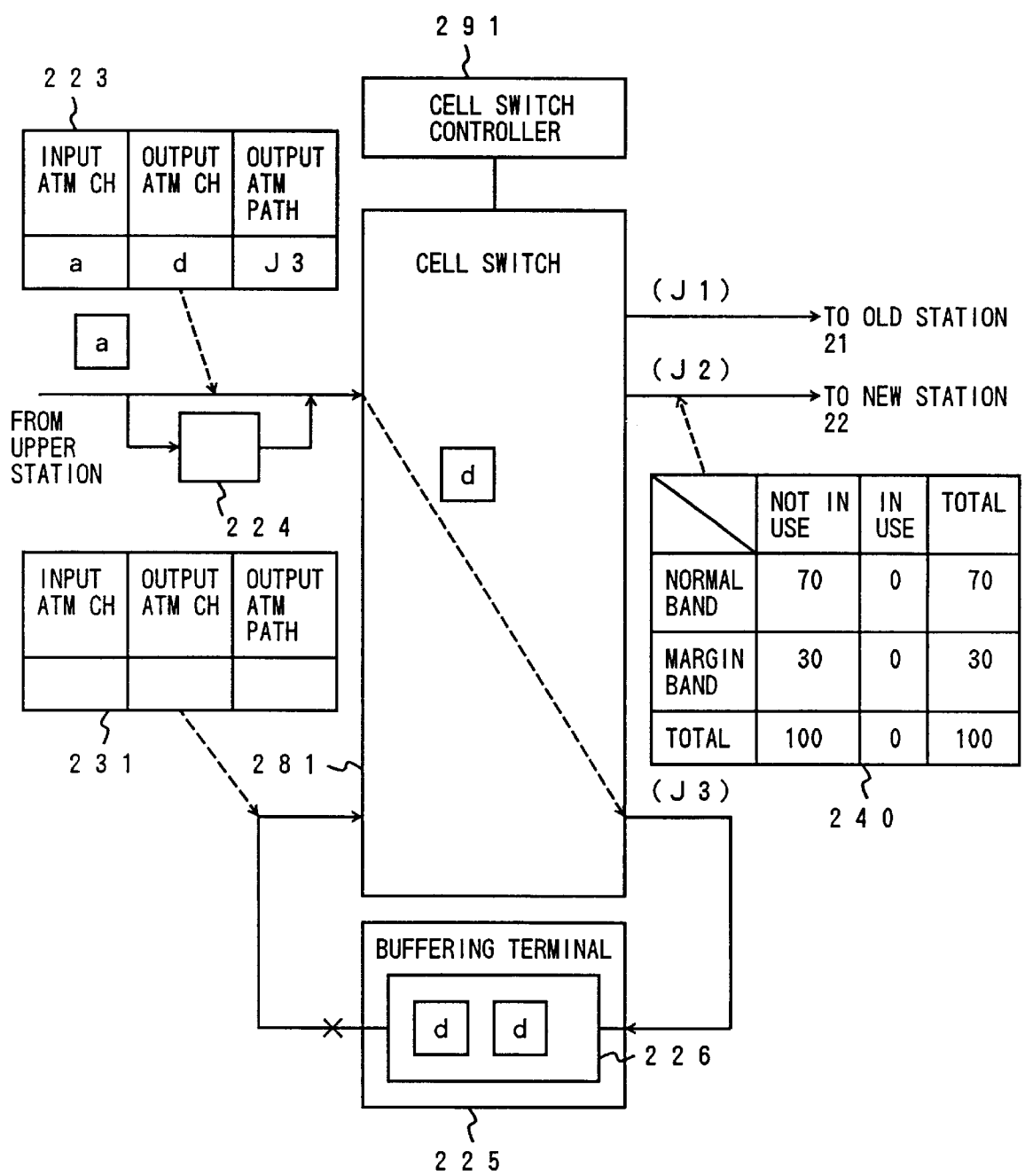

FIG. 16 shows a state observed during the hand-over process. By an instruction by the cell switch controller 291, the input buffer 226 for virtual channel (d) is ensured in the buffering terminal 225 and is inhibited from outputting cells (this is indicated by "x" in FIG. 16). The cell switch controller 291 updates the output destination table 223 so that the cell of the virtual channel (a) in the input ATM transmission path should be sent, as a cell of the virtual channel (d), to the output ATM transmission path J3. Hence, the cells addressed to the mobile station 11 are queued in the input buffer 226. It will be assumed that the bit rate of the cells is equal to "10".

Figure 17:
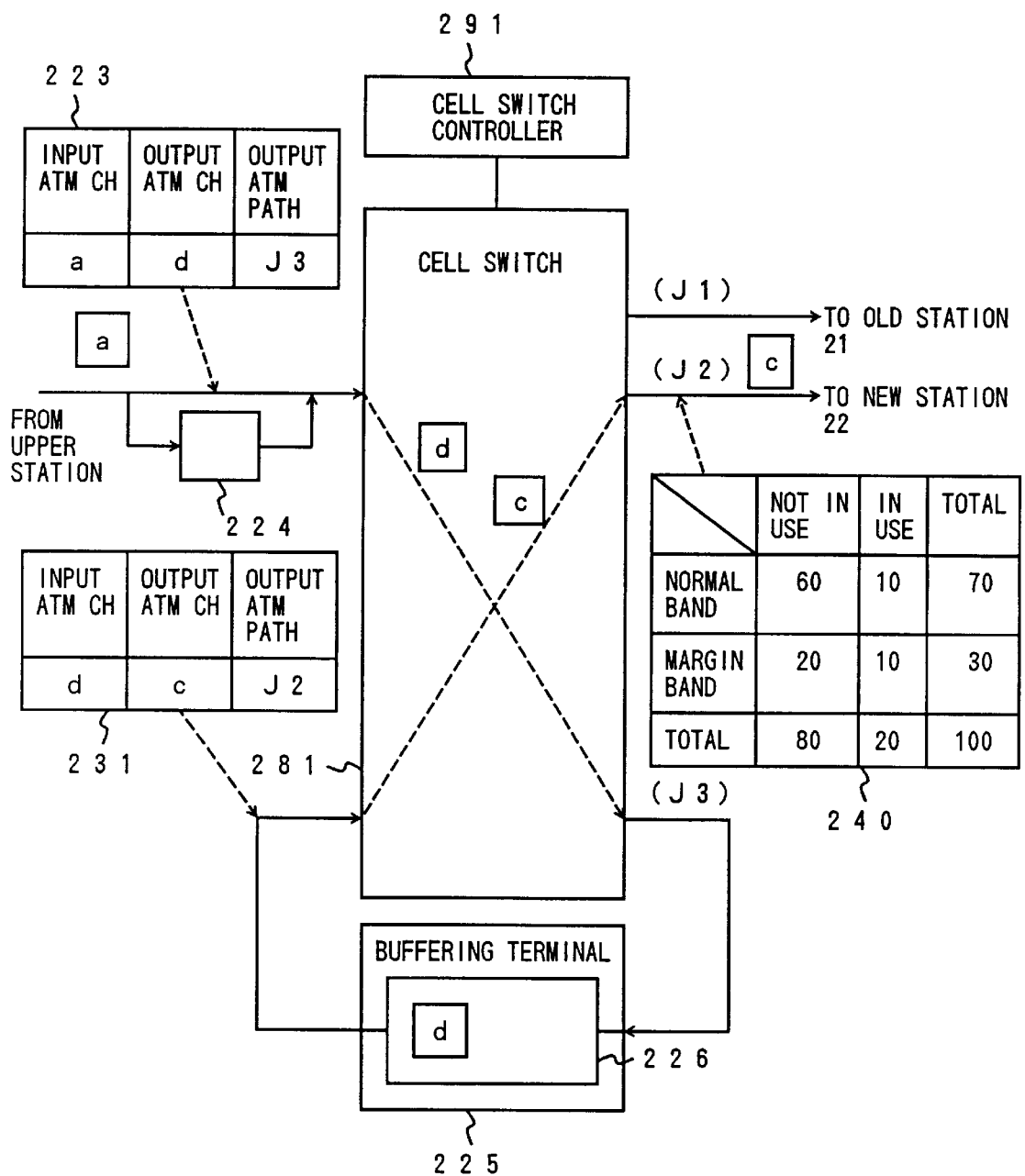

FIG. 17 shows a transient state in which the queuing of the cells stored in the input buffers 226 after the hand-over process is completed is about to be released. The cell switch controller 291 updates the output destination table 231 so that the virtual channel (d) in the input ATM transmission path from the buffering terminal 225 is output, as virtual channel (c), to the output ATM transmission path J2.

As described above, the cells are queued before the hand-over process is initiated, and the queuing of the cells is released after the hand-over process is completed. Then, the queued buffers are sent to the cell switch 281, so that the cells can be prevented from being lost during the hand-over process. In this case, it is necessary to send the queued cells at a bit rate higher than that employed in the normal operation (without queuing) immediately after the queuing of cells is released. At this time, if the sending of the queued cells exceeds the available capacity in the ATM transmission path, a congestion will occur.

Hence, it is necessary to allocate the transmission band to ensure a margin and thus prevent occurrence of a congestion in the ATM node. Simultaneously, it is necessary to control the bit rate to prevent the bit rate from exceeding the allocated band. Additionally, it is necessary to limit the setting of a margin to a time as short as possible because it decreases the channel efficiency.

In the third embodiment of the present invention, "10" of the allocated normal band and "10" of the allocated margin band are ensured in the band management table 240 for the output ATM transmission path J2. The normal band ensured in the output ATM transmission path J2 is the same band as the input ATM virtual channel. As has been described previously, the magnitude of the margin band is determined based on the current traffic (the magnitude of the band which is not in use) and the capability of the buffering terminal 225. The larger the larger margin band, the sooner the queuing of cells can be released.

When the normal band and the margin band are ensured as described above, the cell switch controller 291 instructs the buffering terminal 225 to send the cells of the virtual channel (d) at the bit rate "20". Hence, the cells are input to the buffering terminal 25 at a bit rate of "10", while the cells are output therefrom at a bit rate of "20". Hence, after a given time, all the cells queued in the input buffer 226 are completely sent therefrom, so that the queuing can be released.

Figure 18:
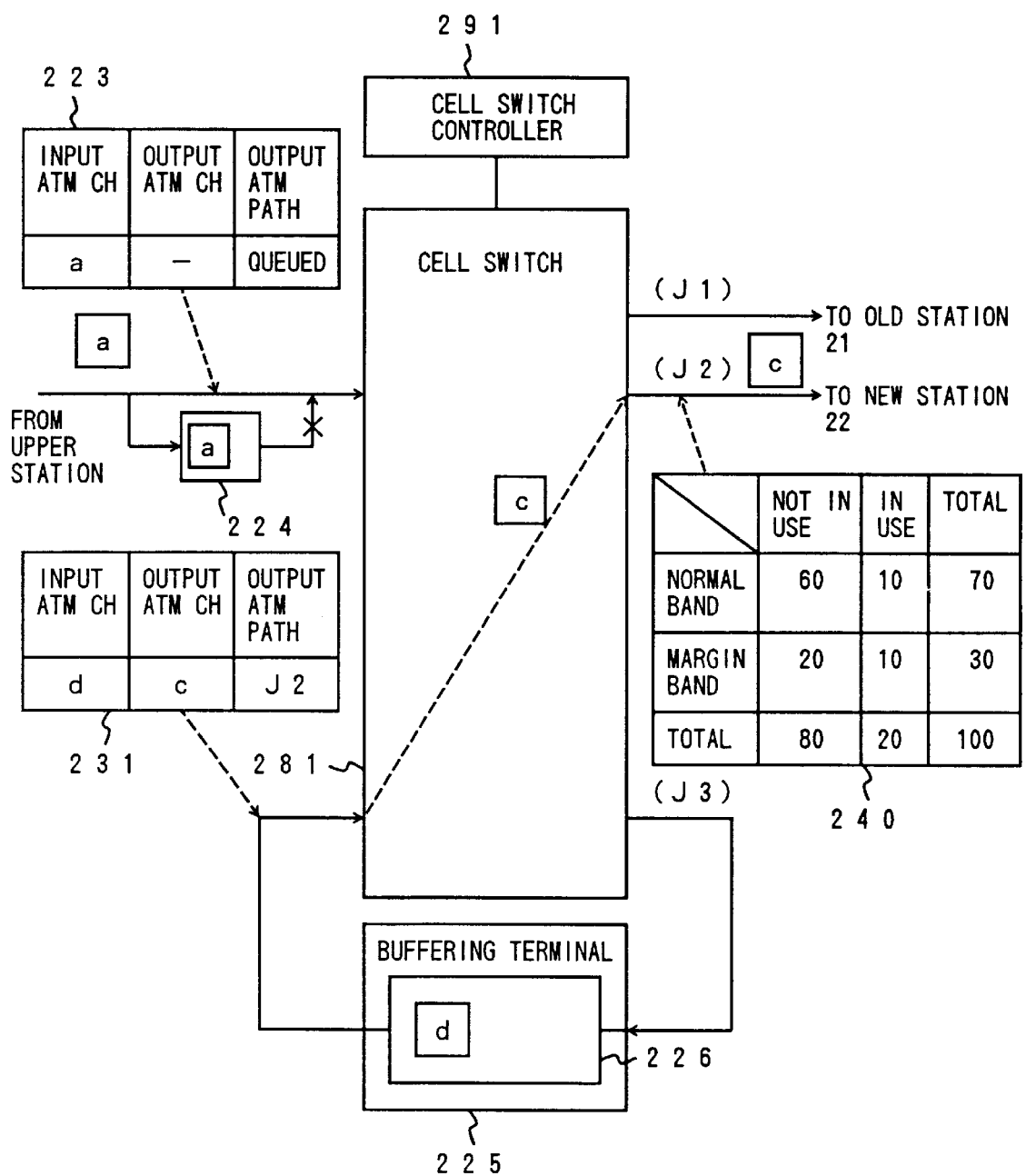

FIG. 18 shows a state in which the queuing of the cells in the input buffer 226 of the buffering terminal 225 has been released after the hand-over process. The cell switch controller 291 updates the output destination table 223 so that the cells of the virtual channel (a) in the input ATM transmission path are to be queued. Hence, the cells of the virtual channel (a) on the input ATM transmission path are queued in the output cell queuing buffer 224. As a result, the input buffer 226 becomes empty after all the cells via the input buffer 226 are sent to the output ATM transmission path J2.

Figure 19:
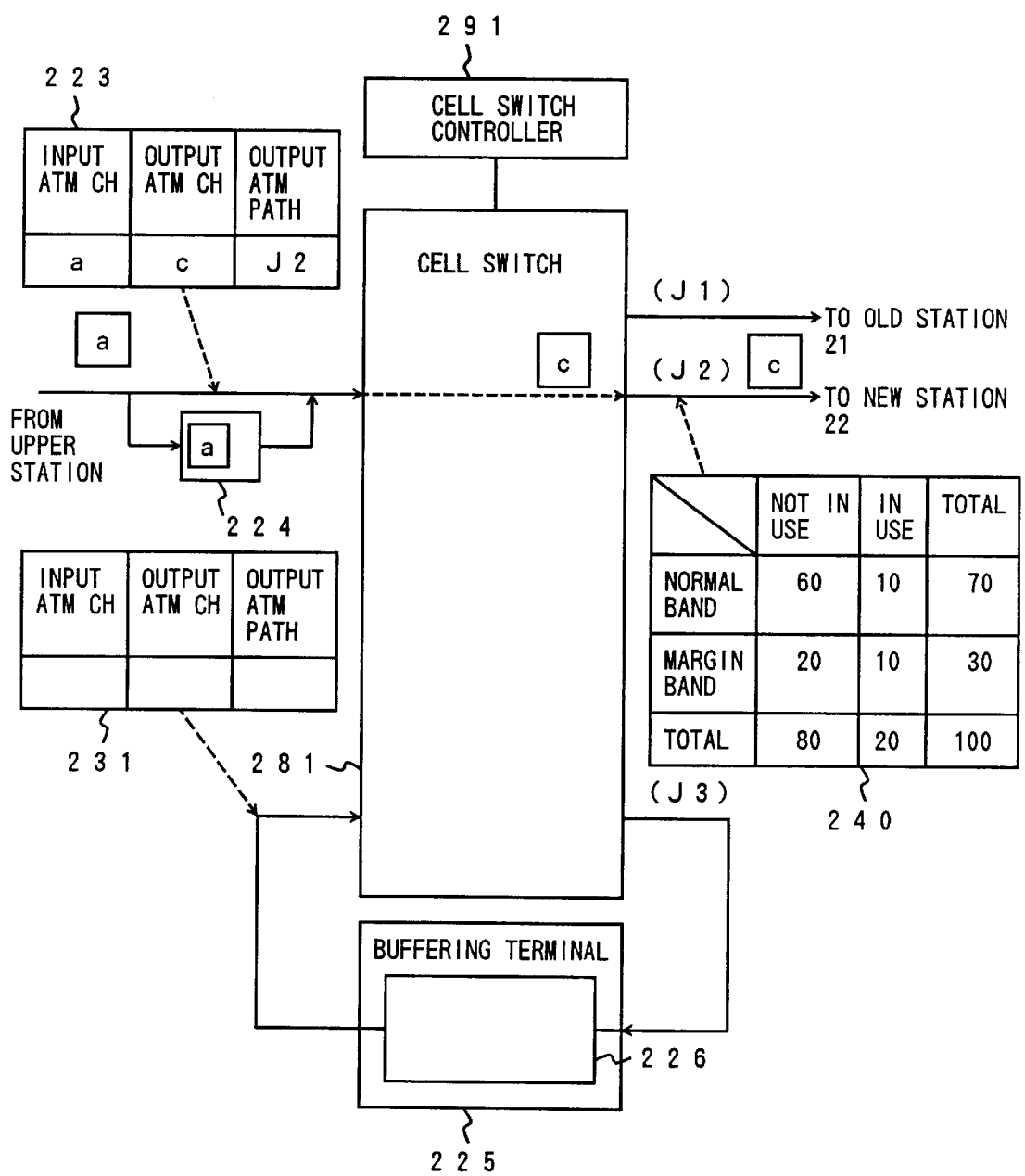

FIG. 19 shows a transient state in which all the cells in the input buffer 226 are sent to the output ATM transmission path J2, and then the queuing of the cells in the output cell queuing buffer 224 on the input ATM transmission path is about be released. The cell switch controller 291 modifies the output destination table 223 so that the virtual channel of the cell on the input ATM transmission path is changed to the virtual channel (c) from the virtual channel (a) so that the cell is sent to the output ATM transmission path J2. Further, the controller 291 sets the bit rate for reading the cells from the output cell queuing buffer 224 to "20". Hence, the input virtual channel (a) is connected to the virtual channel (c) connected to the new base station 22, and the cells in the buffer 224 are sent thereto at the bit rate of "20". As a result, the queuing of the cells in the buffer 224 is released.

Figure 20:
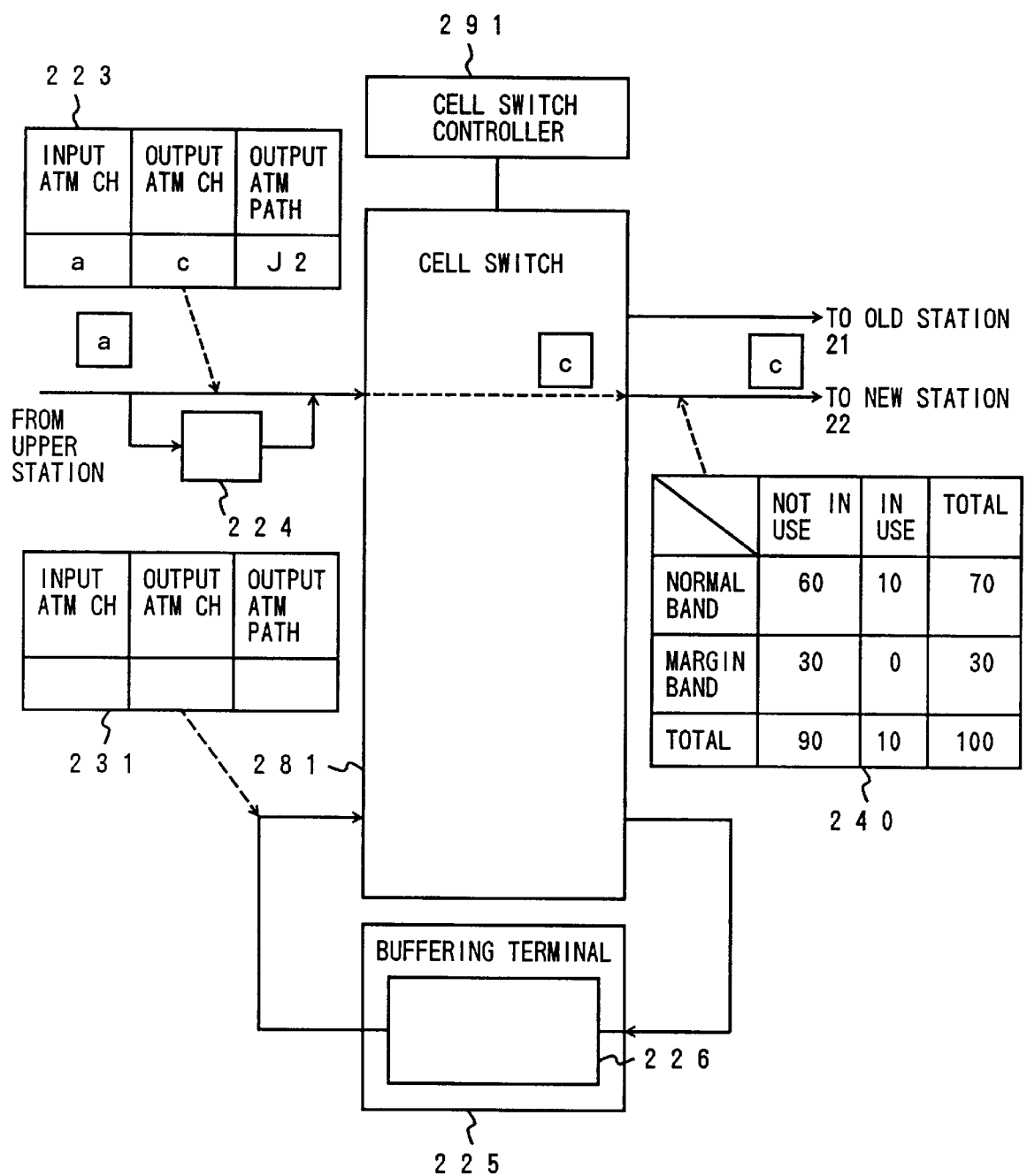

FIG. 20 shows a stationary state observed after the hand-over process. The cell switch controller 291 releases the margin band "10" from the band management table 240 for the output ATM transmission path J2.

A further description will be given of the operation of the third embodiment of the present invention.

The third embodiment of the present invention uses, in addition to the aforementioned hand-over start cell, hand-over end cell and hand-over start acknowledge cell, other control cells, that is, a storage start cell, a storage end cell, a storage start acknowledge cell and a number-of-stored-cell notification cell respectively shown in FIGS. 21A, 21B, 21C and 21D.

The storage start cell shown in FIG. 21A includes, in addition to the aforementioned parameters $ID_S$, $VCI_S$, $ID_D$ and $ID_M$, information indicative of an ATM transmission path to the upper station, a virtual channel to the upper station allocated to the buffering terminal 225, and a virtual channel to the hand-over destination allocated to the buffering terminal 225.

The storage end cell includes shown in FIG. 21B information indicative of a path to the upper station, a virtual channel to the upper station, a virtual channel to the upper station allocated to the buffering terminal 225, a virtual channel to the hand-over destination allocated to the buffering terminal 225, a transmission path to the hand-over destination, a virtual channel to the hand-over destination, and a bit rate for transmission.

The store start acknowledge cell shown in FIG. 21C includes, the aforementioned parameters $ID_S$, $VCI_S$, $ID_D$ and $ID_M$, information indicative of an ATM transmission path to the upper station, a virtual channel to the upper station allocated to the buffering terminal 225, and a virtual channel to the hand-over destination allocated to the buffering terminal 225.

The number-of-stored-cell notification cell shown in FIG. 21D includes information indicative of a path to the upper station, a virtual channel to the upper station, a virtual channel to the upper station allocated to the buffering terminal 225, a virtual channel to the hand-over destination allocated to the buffering terminal 225, a transmission path to the hand-over destination, a virtual channel to the hand-over destination, and the number of stored cells.

Figure 22A:
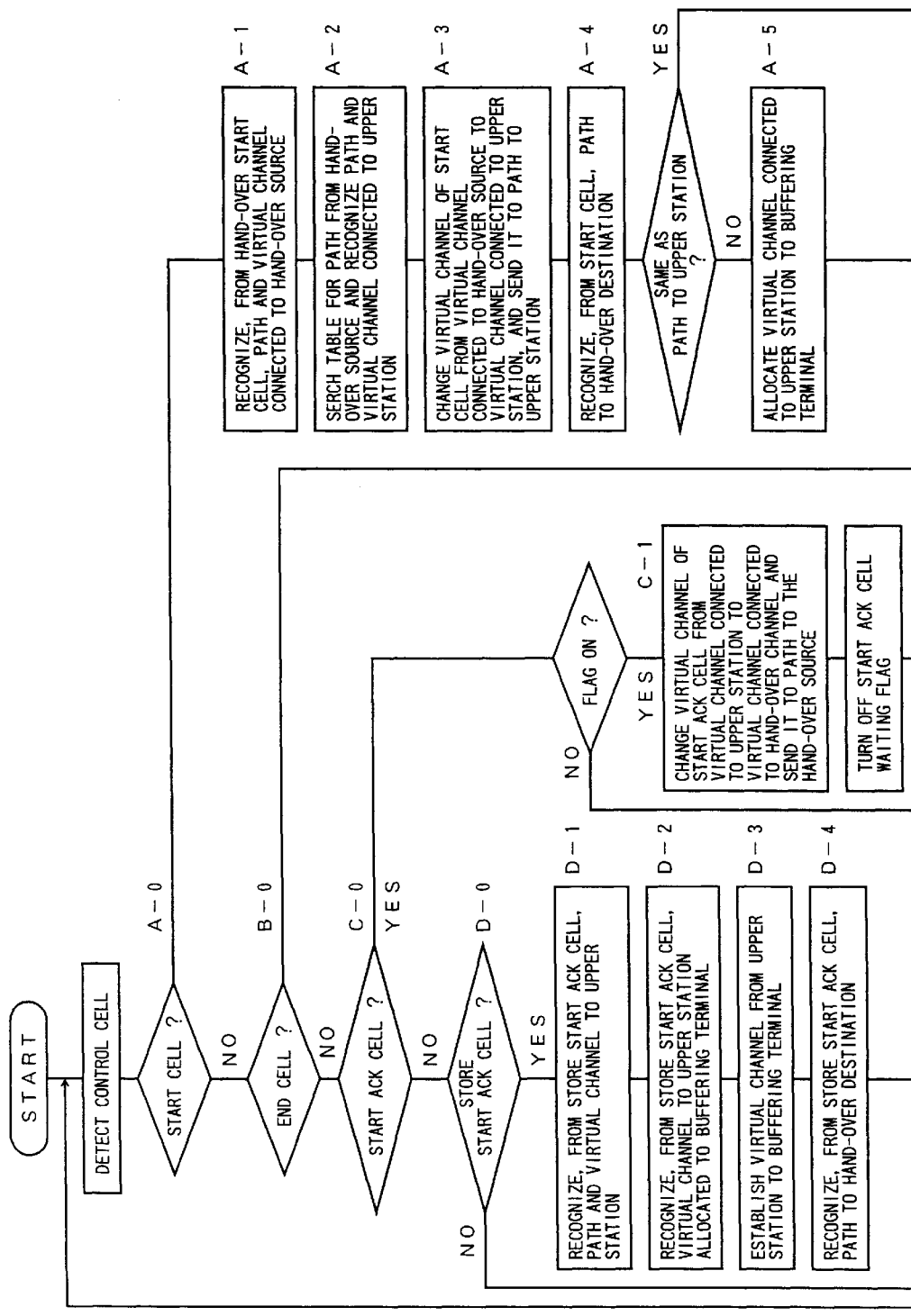
Figure 22B:
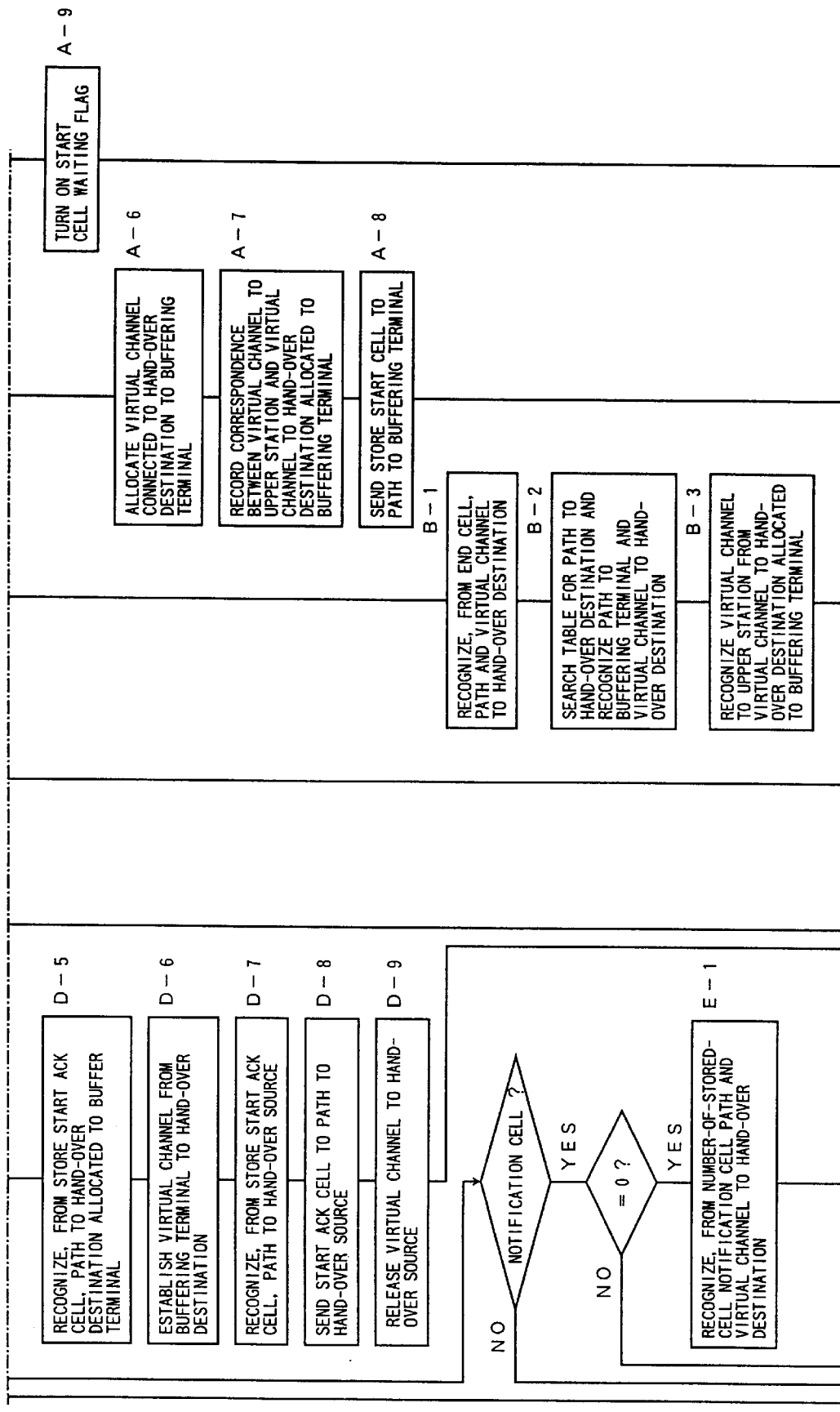

FIGS. 22A, 22B and 22C are flowcharts of the operation of the cell switch controller 291 of the control station 281. The steps given labels "A-n" (n=0, 1, 2, . . . ) are executed when the hand-over start cell is received. The steps given labels "B-n" are executed when the hand-over end cell is received. The steps given labels "C-n" are executed when the start acknowledge cell is received. The steps given labels "D-n" are executed when the storage start acknowledge cell is received. The steps given labels "E-n" are executed when the number-of-stored-cell notification cell indicating a number equal to 0 is received.

Figure 23:
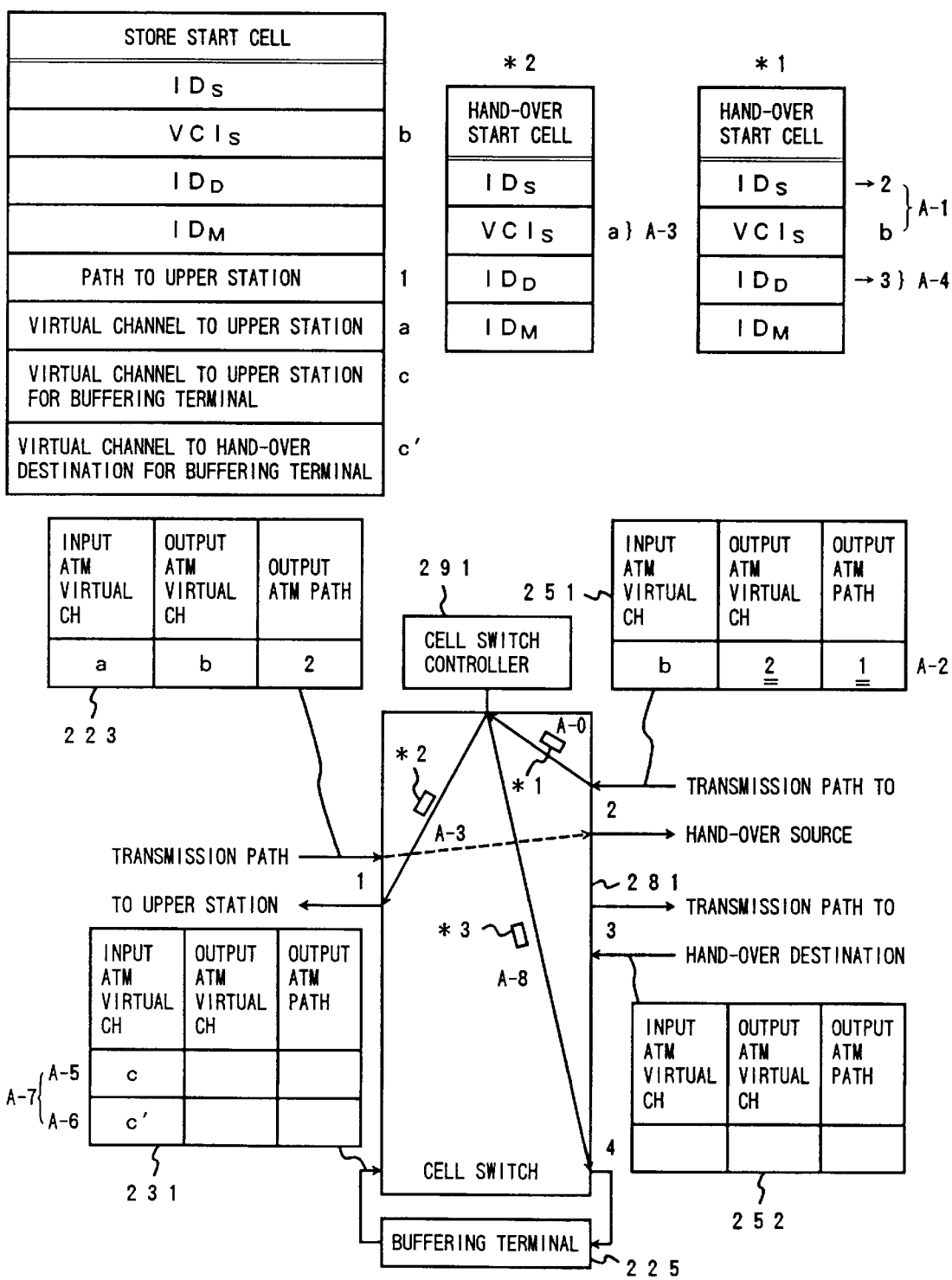
FIG. 23 is a block diagram showing an operation of the third embodiment of the present invention carried out when a hand-over start cell is detected.

First, a description will be given of the steps with labels "A-n" by further referring to FIG. 23, in which processes corresponding to the steps "A-n" are indicated by using the same labels. When the cell switch controller 291 of the control station 281 detects a control cell, it determines whether the received control cell is the hand-over start cell. When the answer is YES (A-0), the controller 291 recognizes, from the hand-over start cell, the ATM transmission path (2) and the virtual channel (b) connected to the hand-over source (A-1). Next, the controller 291 searches an output destination table 251 provided for the input ATM transmission path connected to the hand-over source mobile station, and recognizes the output ATM transmission path (1) of the upper control station and the virtual channel (a) thereof (A-2). Then, the controller 291 changes the virtual channel of the hand-over start cell from the original value (b) to the value (a) of an upper control station, and sends the modified hand-over start cell to the output ATM transmission path 1 (A-3). Then, the controller 291 recognizes the output ATM transmission path (3) connected to the hand-over destination from the hand-over start cell (A-4).

The controller 291 determines whether the ATM transmission path recognized from the hand-over start cell is the same as the ATM transmission path towards the upper control station. If the answer is YES, the controller 291 turns ON the start acknowledge cell waiting flag. In this case, the control station 281 equipped with the controller 291 does not switch the route. If the answer is NO, the controller 291 allocates, to the buffering terminal 225, a virtual channel to the upper control station (A-5). The controller 291 allocates, to the buffering terminal 225, a virtual channel to the hand-over station (A-6). The controller 291 records the correspondence between the virtual channel allocated to the upper control station and the virtual channel allocated to the hand-over destination (A-7). Then, the controller 291 sends the storage start cell to the transmission path connected to the buffering terminal 225 (A-8).

Figure 24:
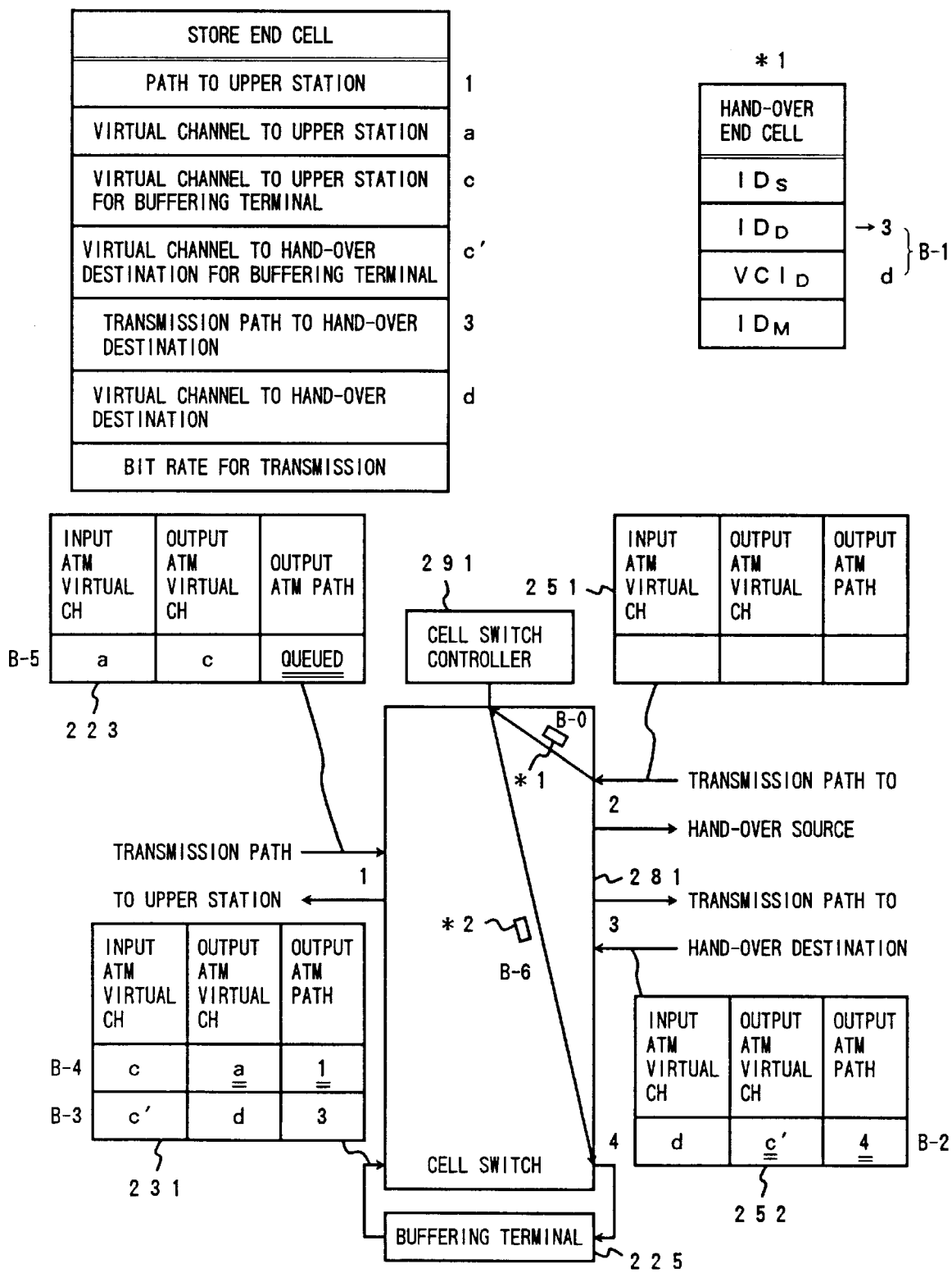
FIG. 24 is a block diagram showing an operation of the third embodiment of the present invention carried out when a hand-over end cell is detected.

When the hand-over end cell is received (B-0), the controller 291 operates as shown in FIG. 24. More particularly, the controller 291 recognizes, from the hand-over end cell, the ATM transmission path and the virtual channel connected to the hand-over destination (B-1), as shown in FIG. 12. The controller 291 searches an output destination table 252 connected to the input ATM transmission path from the hand-over destination, and recognizes the ATM transmission path to the buffering terminal 225 and the virtual channel to the hand-over destination (B-2). The controller 291 recognizes the virtual channel to the upper station from the virtual channel to the hand-over destination allocated to the buffering terminal 225 (B-3). The controller 291 searches the output destination table 231, and recognizes the ATM transmission path and the virtual channel to the upper station (B-4). The controller 291 searches the output destination table for the ATM transmission path to the upper control station, and sets the output ATM transmission path information to "to be queued" (B-5). The controller 291 sends the storage end cell to the ATM transmission path to the buffering terminal 224.

Figure 25:
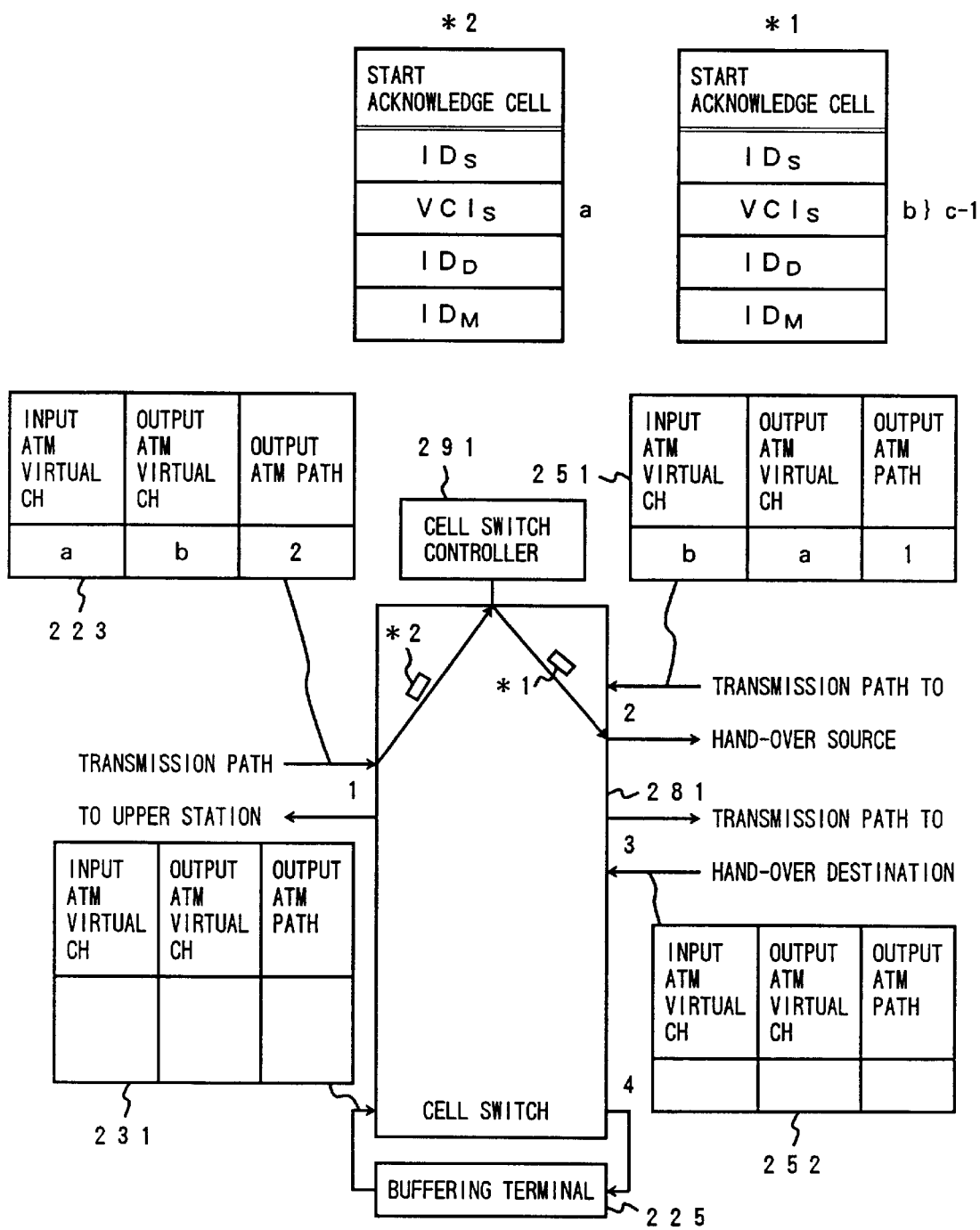
FIG. 25 is a block diagram showing an operation of the third embodiment of the present invention carried out when a hand-over start acknowledge cell is detected.

The process carried out when the start acknowledge cell is received is the same as that shown in FIG. 10A, and is illustrated in FIG. 25.

Figure 26:
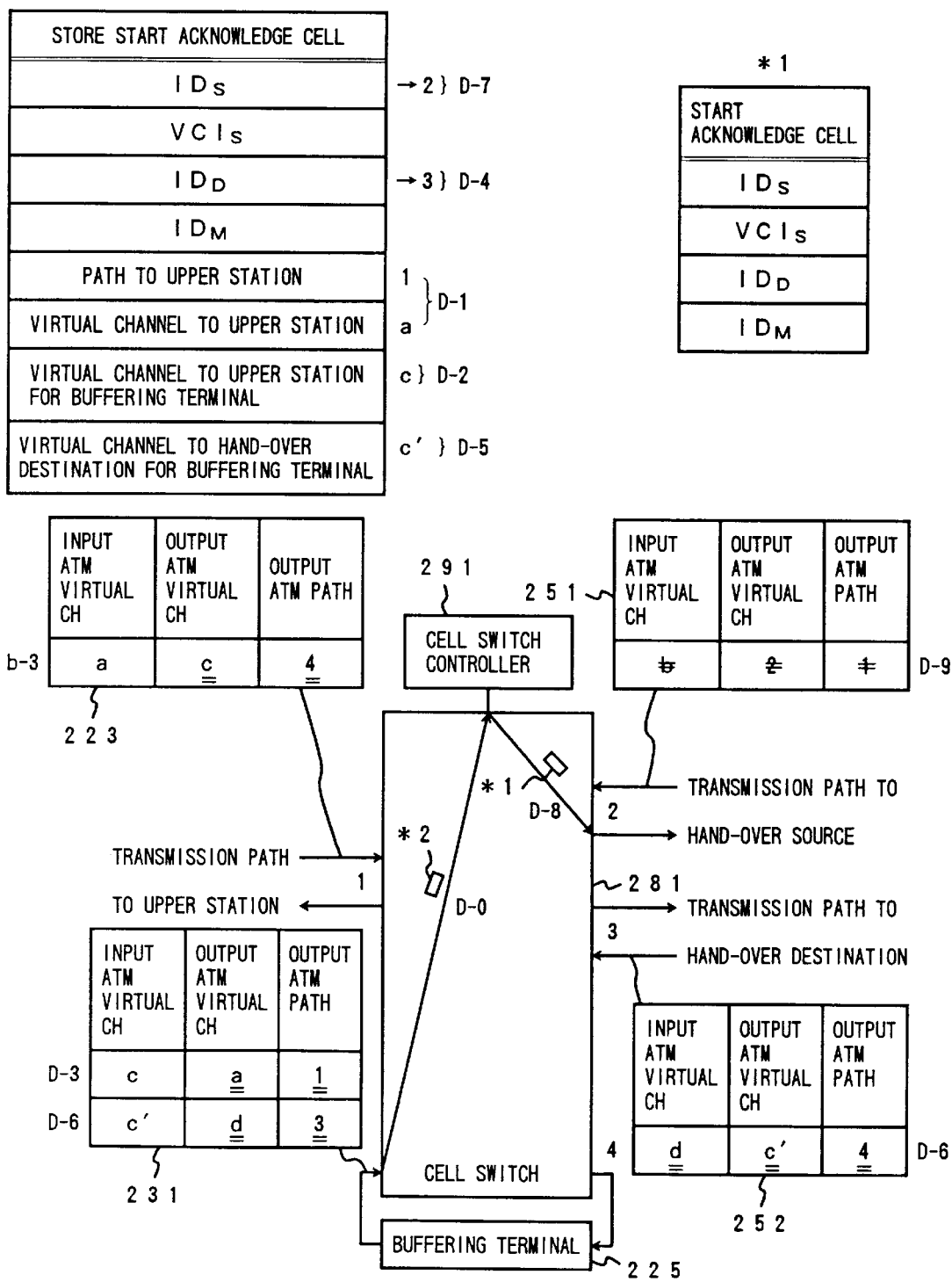
FIG. 26 is a block diagram showing an operation of the third embodiment of the present invention carried out when a store start acknowledge cell is detected.

When the storage start acknowledge cell is received from the buffering terminal 225 (D-1), the controller 291 operates as shown in FIG. 26. the controller 291 recognizes, from the storage start acknowledge cell, the ATM transmission path (1) and virtual channel (a) to the upper control station (D-1). The controller 291 recognizes, from the storage start acknowledge cell, the virtual channel (c) to the upper station allocated to the buffering terminal 225 (D-2). The controller 291 establishes a virtual channel (c') from the upper control station to the buffering terminal (D-3). The controller 291 recognizes, from the storage start acknowledge cell, the ATM transmission path (3) to the hand-over destination (D-4).

The controller 291 recognizes, from the storage start acknowledge cell, the virtual channel (c') to the hand-over destination allocated to the buffering terminal 225 (D-5). The controller 291 establishes a virtual channel to the hand-over destination from the buffering terminal 225 (D-6). In this case, the contents of the tables 231 and 252 are as shown in FIG. 26. The controller 291 recognizes, from the storage start acknowledge cell, the ATM transmission path (2) connected to the hand-over source (D-7). The controller 291 sends the start acknowledge cell to the ATM transmission path to the hand-over source (D-8). Finally, the controller 291 releases the virtual channel to the hand-over source (D-9).

Figure 27:
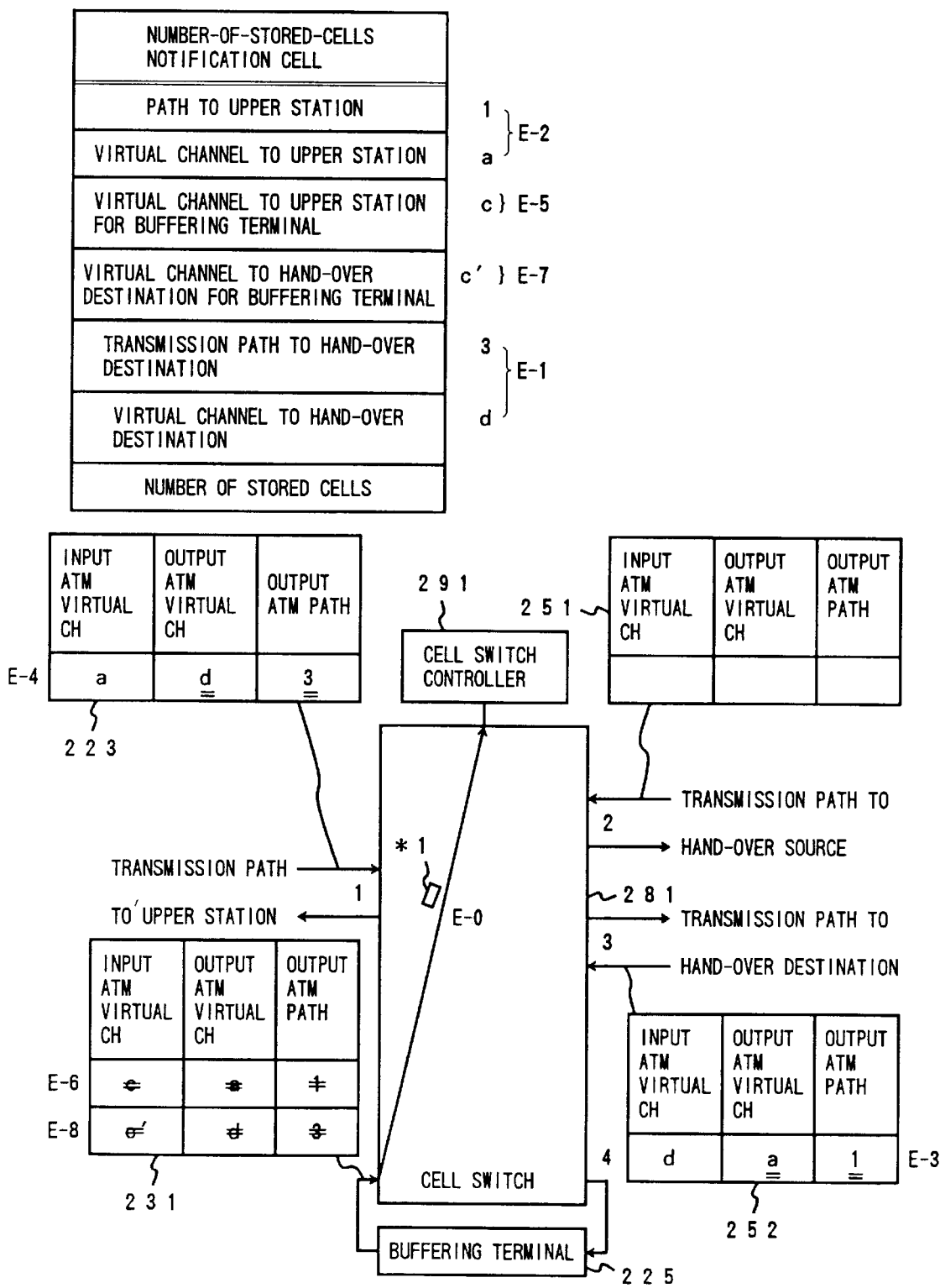
FIG. 27 is a block diagram showing an operation of the third embodiment of the present invention carried out when a number-of-stored-cell notification cell is detected.

When the number-of-stored-cell notification cell is received and it indicates a number other than 0, the controller 291 operates, as shown in FIG. 27. The controller recognizes, from the number-of-stored-cell notification cell, the transmission path (3) and virtual channel (d) to the hand-over destination (E-1). The controller 291 recognizes, from the number-of-stored-cell notification cell, thee transmission path (1) and the virtual channel (a) to the upper control station (E-2). The controller 291 searches the output destination table 252 for the ATM transmission path connected to the hand-over destination, and sets an ATM transmission path (1) and a virtual channel (a) to the upper control station (E-3). The controller 291 searches the output destination table 223 for the ATM transmission path to the upper control station, and sets an ATM transmission path (3) and a virtual channel (d) to the hand-over destination (E-4). The controller 291 recognizes, from the number-of-stored-cell notification cell, the virtual channel (c) to the upper control station allocated to the buffering terminal 225 (E-5). The controller 291 searches the output destination table 231 for the ATM transmission path of the buffering terminal 225, and deletes the contents thereof (E-6). The controller 291 recognizes, from the number-of-stored-cell notification cell, the virtual channel (c') to the hand-over destination allocated to the buffering terminal (E-7). Finally, the controller 291 searches the output destination table 231 and deletes the contents thereof (E-8).

Figure 28:
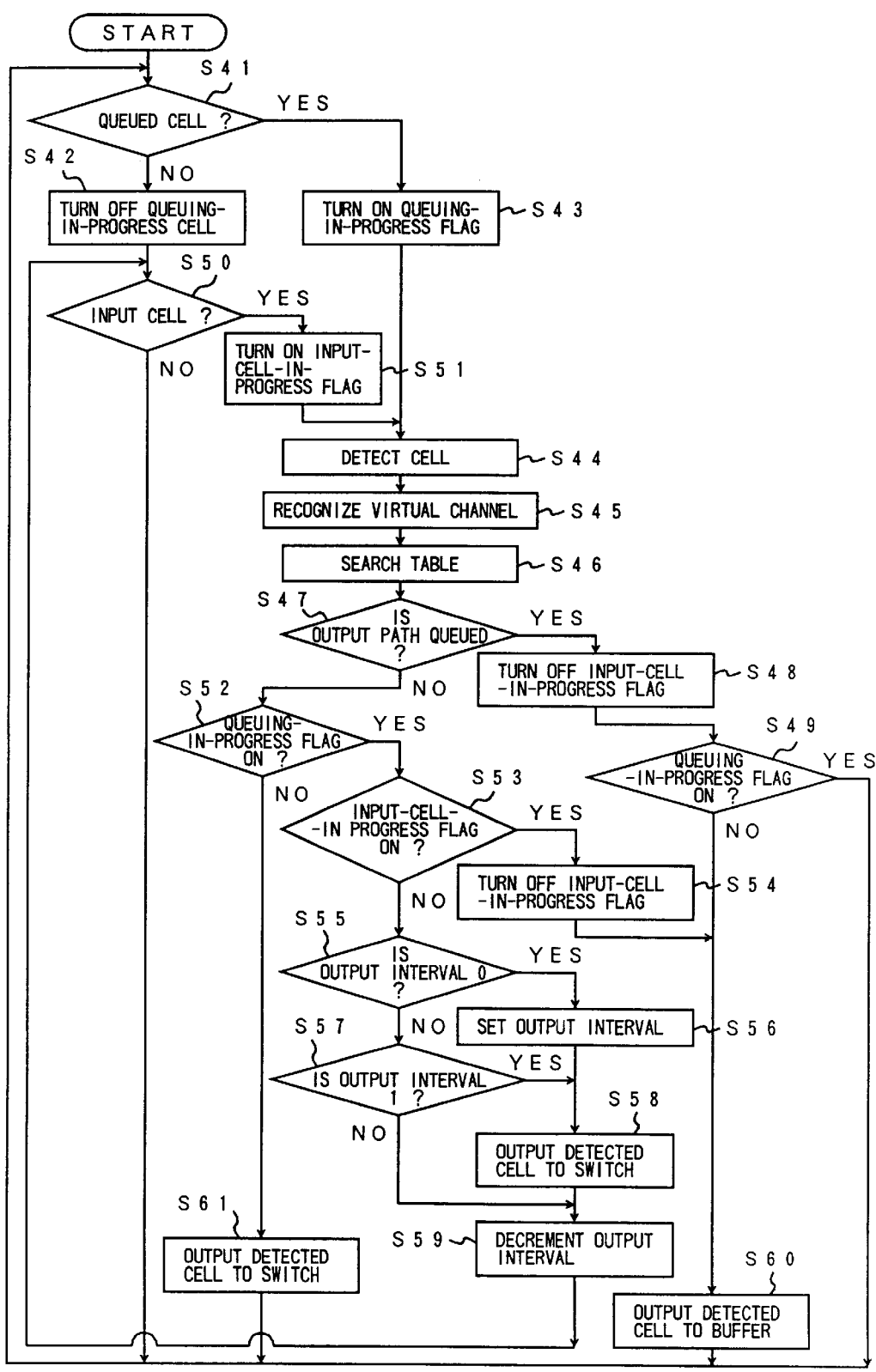
FIG. 28 is a flowchart of an operation of a flow control module used in the third embodiment of the present invention.

FIG. 28 is a flowchart of the operation of each of the flow control modules 222 and 230. At step S41, the flow control module determines whether or not there is a cell in the corresponding output cell queuing buffer. When the answer is NO, the flow control module turns OFF a queuing-in-progress flag at step S42, and proceeds with step S50. When the answer of step S50 is NO, the process returns to step S41. When the answer at step S41 is YES, the flow control module turns ON the queuing-in-progress flag at step S43, and proceeds with step S44. When the answer at step S50 is YES, the flow control module turns ON an input-cell-in-progress flag at step S51, and proceeds with step S44.

The flow control module detects a cell at step S44, and recognizes the virtual channel thereof at step S45. Then, the flow control module searches the output destination table at step S46, and determines, at step S47, whether cells to be output to the output ATM transmission path should be queued. When the answer at step S47 is YES, the flow control module turns OFF an input-cell-in-progress flag at step S48, and determines, at step S49, whether the queuing-in-progress flag is ON. When the answer of step S49 is YES, the process returns to step S41. When the answer at step S49 is NO, the flow control module outputs the detected cell to the output cell queuing buffer.

When the answer at step S47 is NO, the flow control module determines, at step S52, whether the queuing-in-progress flag is ON. When the answer at step S52 is NO, the flow control module outputs the cell detected at step S44 to the cell switch 281. When the answer at step S52 is YES, the flow control module determines, at step S53, whether the input-cell-in-progress flag is ON. When the answer at step S53 is YES, the flow control module turns OFF the input-cell-in-progress flag at step S54, and proceeds with step S60.

When the answer at step S53 is NO, the flow control modules determines, at step S55, whether an output interval used for determining the bit rate for transmission is equal to 0. When the answer of step S55 is YES, the flow control module sets the output interval, and proceeds with step S58. When the answer at step S55 is NO, the flow control module determines, at step S57, whether the output interval is equal to 1. When the answer at step S57 is YES, the flow control module outputs the detected cell to the cell switch at step S58, and proceeds with step S59, which is also carried out when the answer at step S57 is NO. At step S59, the flow control module decrements the output interval and returns to step S50.

Figure 29:
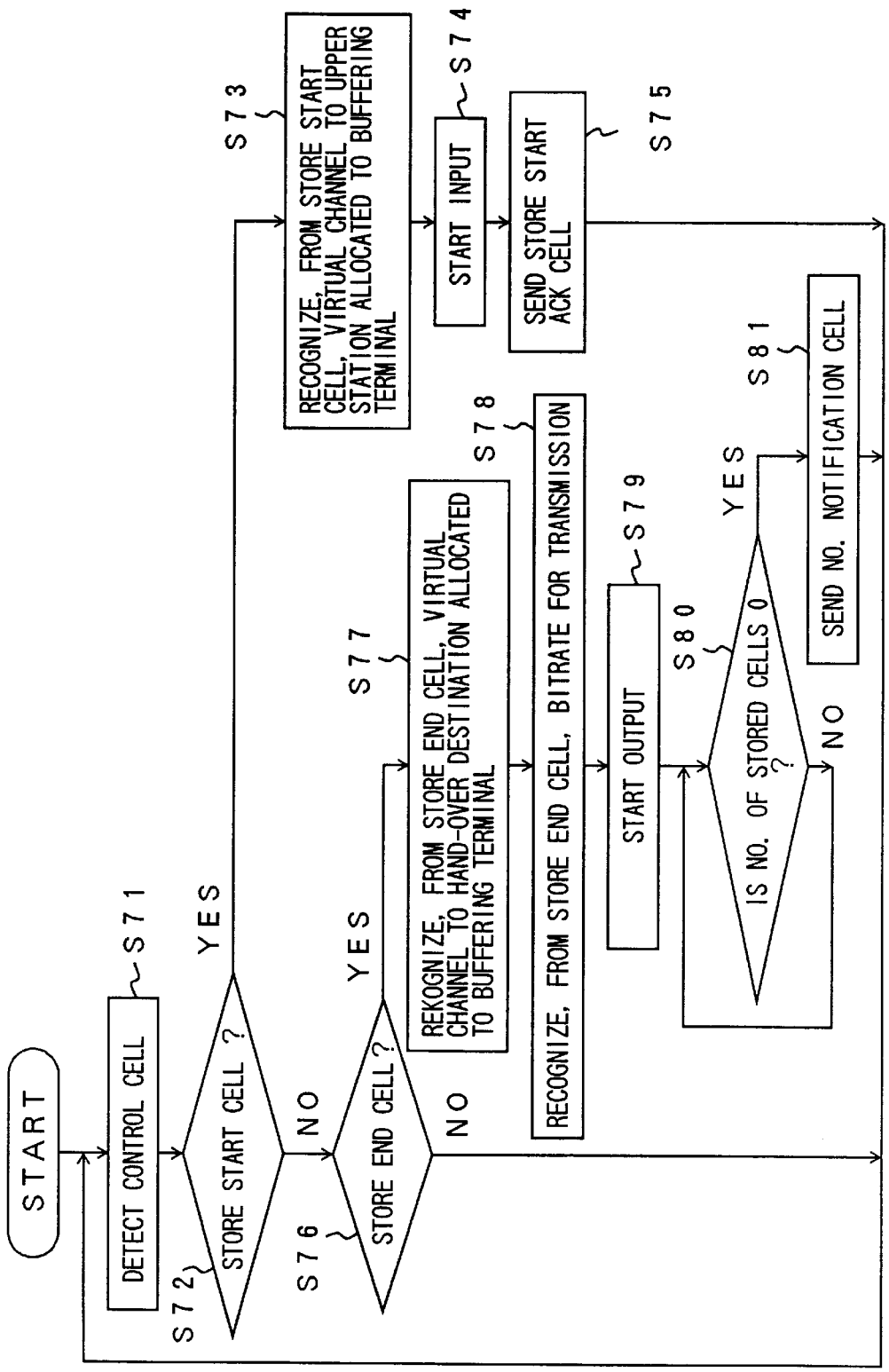
FIG. 29 is a flow chart of an operation of a buffering terminal used in the third embodiment of the present invention.

FIG. 29 is a flowchart of the operation of the cell sending module 229 of the control station 231. At step S71, the module 229 detects a control cell. At step S72, the module 229 determines whether the control cell is the store start cell. When the result of step S72 is YES, the module 229 recognizes, from the store start cell, the virtual channel to the upper station allocated to the buffering terminal 225 at step S73. The module 229 starts to input cells at step S74, and sends the store start acknowledge cell to the ATM transmission path. When the answer of step S72 is NO, the module 229 determines, at step S76, whether the control cell is the store end cell. When the answer of step S76 is NO, the process returns to step S71. When the answer of step S76 is YES, the module 229 recognizes, from the store end cell, the virtual channel to the hand-over destination allocated to the buffering terminal 225 at step S77. Then, the module 229 recognizes, from the store end cell, the bit rate of a transmission. Thereafter, the module 229 starts to output the cell at step S79. At step S80, the module 229 determines whether the number of cells stored is zero. The step S80 is repeatedly carried out until there is no cell stored. When the answer of step S80 is YES, the module 229 sends the number-of-stored-cell notification cell to the ATM transmission line.

As described above, according to the third embodiment of the present invention, the cells are stored in the buffering terminal 225 when the hand-over process is executed. Hence, the flow control of the third embodiment of the present invention can be easily realized by using the buffer terminal 225. According to the third embodiment of the present invention, the input buffers 226 through 228 shown in FIG. 14 can be assigned to respective virtual channels, and the bit rates for transmission can be specified for the respective virtual channels. Hence, it is possible to suppress an increase in the band used to release the queued cells after the hand-over process and to thus avoid congestion. It is also possible to efficiently utilize the channels because the normal band and margin band are used in the transient period after the hand-over process and only the normal band is used in the normal state.

In the above description of the third embodiment of the present invention, the buffering terminal 225 performs the switch-back operation of the ATM transmission line after the hand-over process is completed. Alternatively, it is possible to maintain the ATM transmission line via the buffering terminal 225 until the call is terminated. In another manner, if the output transmission band has a sufficient afford, only the normal band is ensured and the communication takes place via the buffering terminal 225. Then, the switch-back operation is carried out after a sufficient afford becomes available or all the cells buffered in the buffering terminal 225 are output.

In the aforementioned third embodiment of the present invention, the single buffering terminal 225 having a plurality of input buffers is used. It is also possible to employ a plurality of buffering terminals each having a plurality of input buffers.

The third embodiment of the present invention can be applied to not only the hand-over process in the mobile communications system but also a virtual channel switching process directed to bypassing a fault or avoiding congestion.

The present invention is not limited to the specifically disclosed embodiments, and variations and modifications may be made without departing from the scope of the present invention.

What is claimed is:

1. A method for a flow control to a mobile communication network in which an ATM virtual channel established between a first base station having a radio zone in which a mobile station exists and a terminating ATM node to which a remote station with which the mobile station communicates is connected, said method comprising the steps of:

(a) sending hand-over start information to an ATM node accommodating the first base station therefrom when, the mobile station moves to a radio zone covered by a second base station;

(b) recognizing, in an ATM node in which the ATM virtual channel between the mobile station and the remote station is formed even after a hand-over, an ATM transmission path and an ATM virtual channel directed to the second base station;

(c) queuing, in the ATM node, incoming cells to be transferred via the recognized ATM transmission path;

(d) sending hand-over end information to the ATM node from the second base station when the hand-over is completed;

(e) recognizing, from the hand-over end information, the ATM transmission path and the ATM virtual channel directed to the second base station;

(f) stopping queuing at the step (c) and outputting the incoming cells queued to the second base station via the recognized ATM transmission path.

2. The method as claimed in claim 1, further comprising the steps of transferring the hand-over start information and the hand-over end information over the ATM transmission path between the first and second base stations and the terminating ATM node so that ATM nodes located in the ATM transmission path receive the hand-over start information and the hand-over end information, whereby the ATM nodes queue cells directed to the second base station in a distributed formation.

3. The method as claimed in claim 1, wherein the step (c) queues the incoming cells in a buffer provided to an input ATM transmission path connected to an upper ATM node.

4. A method for a flow control to a mobile communication network having a hierarchical structure formed by base stations, ATM nodes directly connected thereto and other ATM nodes, wherein a mobile station located in a radio zone of a first base station communicates with a remote station via an ATM virtual channel formed therebetween, said method comprising the steps of:

(a) sending hand-over start information from the first base station to an ATM node accommodating the first base station when the mobile station moves to a second radio zone accommodated in a second base station, the hand-over start information concerning the second base station and an ATM virtual channel established for the mobile station;

(b) recognizing, from the hand-over start information, an ATM transmission path and an ATM virtual channel directed to the second base station;

(c) queuing, in an upper ATM node located at a hierarchical level higher than the first and second base stations, incoming cells to be transferred via the recognized ATM transmission path;

(d) sending hand-over end information to the upper ATM node from the second base station when the hand-over is completed, said hand-over end information including information concerning the second base station and an ATM virtual channel newly established for the mobile station which is handed over thereto;

(e) recognizing, in the upper ATM node, the ATM transmission path and the ATM virtual channel directed to the second base station from the hand-over end information;

(f) stopping queuing at the step (c) and outputting the incoming cells queued to the second base station via the recognized ATM transmission path.

5. The method as claimed in claim 4, further comprising the step of transferring the hand-over start information and the hand-over end information over the ATM transmission path between the first and second base stations and the terminating ATM node so that ATM nodes located in the ATM transmission path receive the hand-over start information and the hand-over end information, whereby the ATM nodes queue cells directed to the second base station in a distributed formation.

6. The method as claimed in claim 4, wherein the step (c) queues the incoming cells in a buffer provided to an input ATM transmission path connected to an ATM node located at a higher hierarchical level.

7. A method for a flow control to a communication network in which cells are transferred via a virtual channel established between nodes, said method comprising:

(a) temporarily storing incoming cells transferred over an input transmission path in a first buffer in a node in which the virtual channel is switched;

(b) re-routing the virtual channel to another route;

(c) allocating a transmission band of an output virtual channel in an output transmission path in order to send the cells stored in the first buffer thereto at a bit rate higher than that of an input virtual channel thereof and to thus facilitate sending the cells which are stored in the first buffer during a hand-over, (d) sending the cells stored in the first buffer to the output transmission path; and (e) releasing the transmission band allocated to send the cells stored in the first buffer.

8. The method as claimed in claim 7, wherein:

the output transmission path is normally allocated so as to have a normal band and a margin band; and the step (c) allocates the transmission band so as to include a part of the normal band and a part of the margin band.

9. The method as claimed in claim 7, wherein the step (a) comprises the step of storing the incoming cells in the first buffer via a cell switch of the node so that the input virtual channel via which the incoming cells are transferred is connected to the first buffer.

10. The method as claimed in claim 9, further comprising the steps of:
- temporarily storing further incoming cells in a second buffer provided between the input transmission path and the cell switch;
- disconnecting the input virtual channel from the first buffer and connecting it to the output virtual channel;
- allocating a transmission band in the output transmission path in order to send the cells stored in the second buffer thereto at a bit rate higher than that of the input virtual channel thereof;
- sending the cells in the second buffer to the output transmission path; and
- releasing the transmission band allocated to send the cells stored in the second buffer.

11. A node in a communication network in which cells are transferred via a virtual channel established between nodes, said node comprising:
- a cell switch; and
- a buffering terminal,
- said buffering terminal comprising;
  - a buffer temporarily storing incoming cells transferred over an input transmission path; and
  - a cell sending part allocating a transmission band of an output virtual channel in an output transmission path in order to send the cells stored in the buffer thereto at a bit rate higher than that of an input virtual channel thereof and to thus facilitate sending the cells which are stored in the first buffer during a hand-over, and sending the cells stored in the buffer to the output transmission path.

12. A communication network in which cells are transferred via a virtual channel established between nodes, each of said nodes comprising:
- a cell switch; and
- a buffering terminal,
- said buffering terminal comprising:
  - a buffer temporarily storing incoming cells transferred over an input transmission path; and
  - a cell sending part allocating a transmission band of an output virtual channel in an output transmission path in order to send the cells stored in the buffer thereto at a bit rate higher than that of an input virtual channel thereof and to thus facilitate sending the cells which are stored in the first buffer during a hand-over, and sending the cells stored in the buffer to the output transmission path.

13. A method for flow control to a mobile communication network in which cells are transferred via a virtual channel established between a base station having a radio zone in which a mobile station exists and a node in which a remote terminal with which the mobile station communicates is accommodated, said method comprising:
- (a) temporarily storing incoming cells transferred over an input transmission path in a first buffer in the node in which the virtual channel is switched in response to movement of the mobile station of a radio zone of another base station;
- (b) rerouting the virtual channel to another route;
- (c) allocating a transmission band of an output virtual channel in an output transmission path in order to send the cells stored in the first buffer thereto at a bit rate higher than that of an input virtual channel thereof;
- (d) sending the cells stored in the first buffer to the output transmission path; and
- (e) releasing the transmission band allocated to send the cells stored in the first buffer.

14. A mobile communication network in which cells are transferred via a virtual channel established between a base station having a radio zone in which a mobile station exists and a node in which a remote terminal with which the mobile station communicates is accommodated, comprising:
- a cell switch; and
- a buffering terminal,
- said buffering terminal comprising:
  - a buffer temporarily storing incoming cells transferred over an input transmission path; and
  - a cell sending part allocating a transmission band of an output virtual channel in an output transmission path in order to send the cells stored in the buffer thereto at a bit rate higher than that of an input virtual channel thereof, and sending the cells stored in the buffer to the output transmission path,
- the buffering terminal operating when the virtual channel is switched due to movement of the mobile station to a radio zone of another base station.

* * * * *